US009367978B2

(12) United States Patent
Sullivan

(10) Patent No.: US 9,367,978 B2
(45) Date of Patent: Jun. 14, 2016

(54) CONTROL DEVICE ACCESS METHOD AND APPARATUS

(71) Applicant: The Chamberlain Group, Inc., Elmhurst, IL (US)

(72) Inventor: Edward Sullivan, Addison, IL (US)

(73) Assignee: The Chamberlain Group, Inc., Elmhurst, IL (US)

( * ) Notice: Subject to any disclaimer, the term of this patent is extended or adjusted under 35 U.S.C. 154(b) by 239 days.

(21) Appl. No.: 13/833,575

(22) Filed: Mar. 15, 2013

(65) Prior Publication Data

US 2014/0266573 A1 Sep. 18, 2014

(51) Int. Cl.

| | |
|---|---|
| ***B60R 25/00*** | (2013.01) |
| ***G05B 19/00*** | (2006.01) |
| ***G05B 23/00*** | (2006.01) |
| ***E05F 11/00*** | (2006.01) |
| ***H04W 4/00*** | (2009.01) |
| ***H04B 7/00*** | (2006.01) |
| ***H04M 1/00*** | (2006.01) |
| ***G07C 9/00*** | (2006.01) |

(52) U.S. Cl.

CPC ........ *G07C 9/00571* (2013.01); *G07C 2209/04* (2013.01)

(58) Field of Classification Search

CPC ............ G07C 9/00309; G07C 9/00103; E05F 15/2076; B60R 25/04; G06F 3/017; E05Y 2900/148; H04W 88/02; G06K 19/0723; H04M 1/72522

USPC .......... 340/5.16, 5.7, 5.71, 5.61, 5.1, 5.2, 5.5; 49/357; 455/422.1, 41.2, 556.1

See application file for complete search history.

(56) References Cited

U.S. PATENT DOCUMENTS

| | | | |
|---|---|---|---|
| 6,850 | A | 11/1849 | Pone |
| 2,980,827 | A | 4/1961 | Hill |
| 3,536,836 | A | 10/1970 | Pfeiffer |
| 4,325,146 | A | 4/1982 | Lennington |
| 4,360,801 | A | 11/1982 | Duhame |
| 4,408,251 | A | 10/1983 | Kaplan |

(Continued)

FOREIGN PATENT DOCUMENTS

| | | |
|---|---|---|
| DE | 19801119 C1 | 9/1999 |
| EP | 0422190 | 10/1990 |

(Continued)

OTHER PUBLICATIONS

Bill Peisel; "Designing the Next Step in Internet Applicances" Electronic Design/ Mar. 23, 1998.

(Continued)

*Primary Examiner* — George Bugg
*Assistant Examiner* — Munear Akki
(74) *Attorney, Agent, or Firm* — Fitch, Even, Tabin & Flannery LLP

(57) ABSTRACT

Application software for a mobile device can provide an owner or operator of a premises with the ability to remotely grant a guest authorization to access an access control device on or in the premises. The access control device can control the operation of the one or more secondary devices, so that with the owner authorization, the guest can access the access control device to cause an action at the premises with the secondary device. The application software can further provide the owner/operator the ability to restrict the third party access, such as temporally or spatially.

40 Claims, 12 Drawing Sheets

(56) References Cited

U.S. PATENT DOCUMENTS

| | | | | |
|---|---|---|---|---|
| 4,464,651 | A | 8/1984 | Duhame | |
| 4,533,905 | A | 8/1985 | Leivenzon | |
| 4,573,046 | A | 2/1986 | Pinnow | |
| 4,583,081 | A | 4/1986 | Schmitz | |
| 4,629,874 | A | 12/1986 | Pugsley | |
| 4,821,024 | A | 4/1989 | Bayha | |
| 4,922,224 | A | 5/1990 | Drori | |
| 4,987,402 | A | 1/1991 | Nykerk | |
| 5,003,293 | A | 3/1991 | Wu | |
| 5,047,928 | A | 9/1991 | Wiedemer | |
| 5,155,680 | A | 10/1992 | Wiedemer | |
| 5,191,268 | A | 3/1993 | Duhame | |
| 5,247,440 | A | 9/1993 | Capurka | |
| 5,255,341 | A | 10/1993 | Nakajima | |
| 5,278,832 | A | 1/1994 | Binzel | |
| 5,280,527 | A | 1/1994 | Gullman | |
| 5,283,549 | A | 2/1994 | Mehaffey | |
| 5,402,105 | A | 3/1995 | Doyle | |
| 5,444,440 | A | 8/1995 | Heydendahl | |
| 5,473,318 | A | 12/1995 | Martel | |
| 5,475,377 | A | 12/1995 | Lee | |
| 5,541,585 | A | 7/1996 | Duhame | |
| 5,565,843 | A | 10/1996 | Meyvis | |
| 5,565,857 | A | 10/1996 | Lee | |
| 5,596,840 | A | 1/1997 | Teich | |
| 5,608,778 | A | 3/1997 | Partridge, III | |
| 5,656,900 | A | 8/1997 | Michel | |
| 5,689,236 | A | 11/1997 | Kister | |
| 5,731,756 | A | 3/1998 | Roddy | |
| 5,780,987 | A | 7/1998 | Fitzgibbon | |
| 5,781,107 | A | 7/1998 | Ji | |
| 5,805,064 | A | 9/1998 | Yorkey | |
| 5,805,082 | A | 9/1998 | Hassett | |
| 5,883,579 | A | 3/1999 | Schreiner | |
| 5,886,634 | A | 3/1999 | Muhme | |
| 5,917,405 | A | 6/1999 | Joao | |
| 5,940,000 | A | 8/1999 | Dykema | |
| 5,969,637 | A | 10/1999 | Doppelt | |
| 5,990,828 | A | 11/1999 | King | |
| 6,002,332 | A | 12/1999 | King | |
| 6,011,468 | A | 1/2000 | Lee | |
| 6,026,165 | A | 2/2000 | Marino | |
| 6,028,537 | A | 2/2000 | Suman | |
| 6,070,361 | A | 6/2000 | Paterno | |
| 6,127,740 | A | 10/2000 | Roddy | |
| 6,131,019 | A | 10/2000 | King | |
| 6,154,544 | A | 11/2000 | Farris | |
| 6,161,005 | A | 12/2000 | Pinzon | |
| 6,166,634 | A | 12/2000 | Dean | |
| 6,184,641 | B1 | 2/2001 | Crimmins | |
| 6,192,282 | B1 | 2/2001 | Smith | |
| 6,223,029 | B1 | 4/2001 | Stenman | |
| 6,225,903 | B1 | 5/2001 | Soloway | |
| 6,266,540 | B1 | 7/2001 | Edgar, III | |
| 6,271,765 | B1 | 8/2001 | King | |
| 6,278,249 | B1 | 8/2001 | Fitzgibbon | |
| 6,310,548 | B1 | 10/2001 | Stephens, Jr. | |
| 6,326,754 | B1 | 12/2001 | Mullet | |
| 6,346,889 | B1 | 2/2002 | Moss | |
| 6,356,868 | B1 | 3/2002 | Yuschik | |
| 6,388,559 | B1 | 5/2002 | Cohen | |
| 6,400,265 | B1 | 6/2002 | Saylor | |
| 6,404,337 | B1 | 6/2002 | Van | |
| RE37,784 | E | 7/2002 | Fitzgibbon | |
| 6,427,913 | B1 | 8/2002 | Maloney | |
| 6,434,158 | B1 | 8/2002 | Harris | |
| 6,434,408 | B1 | 8/2002 | Heckel | |
| 6,448,894 | B1 | 9/2002 | Desai | |
| 6,476,708 | B1 | 11/2002 | Johnson | |
| 6,476,732 | B1 | 11/2002 | Stephan | |
| 6,484,784 | B1 | 11/2002 | Weik, III | |
| 6,525,645 | B2 | 2/2003 | King | |
| 6,553,238 | B1 | 4/2003 | Ginzel | |
| 6,553,881 | B2 | 4/2003 | Marmin | |
| 6,561,255 | B1 | 5/2003 | Mullet | |
| 6,563,430 | B1 | 5/2003 | Kemink | |
| 6,564,056 | B1 | 5/2003 | Fitzgerald | |
| 6,597,291 | B2 | 7/2003 | Tsui | |
| 6,616,034 | B2 | 9/2003 | Wu | |
| 6,634,408 | B2 | 10/2003 | Mays | |
| 6,661,340 | B1 | 12/2003 | Saylor et al. | |
| 6,686,838 | B1 | 2/2004 | Rezvani | |
| 6,717,528 | B1 | 4/2004 | Burleson | |
| 6,781,516 | B2 | 8/2004 | Reynard | |
| 6,782,662 | B2 | 8/2004 | McCartney | |
| 6,792,083 | B2 | 9/2004 | Dams | |
| 6,803,851 | B1 | 10/2004 | Kramer | |
| 6,803,882 | B2 | 10/2004 | Hoetzel | |
| 6,812,849 | B1 | 11/2004 | Ancel | |
| 6,822,603 | B1 | 11/2004 | Crimmins | |
| 6,823,188 | B1 | 11/2004 | Stern | |
| 6,833,681 | B2 | 12/2004 | Fitzgibbon | |
| 6,850,163 | B1 | 2/2005 | Adamczyk | |
| 6,891,838 | B1 | 5/2005 | Petite | |
| 6,903,650 | B2 | 6/2005 | Murray | |
| 6,919,790 | B2 | 7/2005 | Kanazawa | |
| 6,924,727 | B2 | 8/2005 | Nagaoka | |
| 6,933,843 | B1 | 8/2005 | Hom | |
| 6,960,998 | B2 | 11/2005 | Menard | |
| 6,975,202 | B1 | 12/2005 | Rodriguez | |
| 6,975,226 | B2 | 12/2005 | Reynard | |
| 6,980,117 | B1 | 12/2005 | Kirkland | |
| 6,980,131 | B1 | 12/2005 | Taylor | |
| 6,989,760 | B2 | 1/2006 | Dierking | |
| 6,998,977 | B2 | 2/2006 | Gregori | |
| 7,038,409 | B1 | 5/2006 | Mullet | |
| 7,057,494 | B2 | 6/2006 | Fitzgibbon | |
| 7,071,813 | B2 | 7/2006 | Fitzgibbon | |
| 7,071,850 | B1 | 7/2006 | Fitzgibbon | |
| 7,091,688 | B2 | 8/2006 | Gioia | |
| 7,124,943 | B2 | 10/2006 | Quan | |
| 7,127,847 | B2 | 10/2006 | Fitzgibbon | |
| 7,142,849 | B2 | 11/2006 | Neuman | |
| 7,158,007 | B2 | 1/2007 | Kawamoto | |
| 7,161,319 | B2 | 1/2007 | Ergun | |
| 7,161,466 | B2 | 1/2007 | Chuey | |
| 7,167,076 | B2 | 1/2007 | Wilson | |
| 7,170,998 | B2 | 1/2007 | McLintock | |
| 7,190,266 | B2 | 3/2007 | Mullet | |
| 7,197,278 | B2 | 3/2007 | Harwood | |
| 7,205,908 | B2 | 4/2007 | Tsui | |
| 7,207,142 | B2 * | 4/2007 | Mullet .................... | E05F 15/77<br>340/686.1 |
| 7,221,289 | B2 | 5/2007 | Horn | |
| 7,262,683 | B2 | 8/2007 | Maeda | |
| 7,266,344 | B2 | 9/2007 | Rodriquez | |
| 7,269,416 | B2 | 9/2007 | Guthrie | |
| 7,274,300 | B2 | 9/2007 | Duvernell | |
| 7,289,014 | B2 | 10/2007 | Mullet | |
| 7,298,240 | B2 | 11/2007 | Lamar | |
| 7,306,145 | B2 | 12/2007 | Sakai | |
| 7,310,043 | B2 | 12/2007 | Mamaloukas | |
| 7,323,991 | B1 | 1/2008 | Eckert | |
| 7,331,144 | B2 | 2/2008 | Parsadayan | |
| 7,332,999 | B2 | 2/2008 | Fitzgibbon | |
| 7,365,634 | B2 | 4/2008 | Brookbank | |
| 7,370,074 | B2 | 5/2008 | Alexander | |
| 7,380,375 | B2 | 6/2008 | Maly | |
| 7,392,944 | B2 | 7/2008 | Shieh | |
| 7,424,733 | B2 | 9/2008 | Kamiwada | |
| 7,446,644 | B2 | 11/2008 | Schaffzin | |
| 7,464,403 | B2 | 12/2008 | Hardman, Jr. | |
| 7,468,676 | B2 | 12/2008 | Styers | |
| 7,471,199 | B2 | 12/2008 | Zimmerman | |
| 7,482,923 | B2 | 1/2009 | Fitzgibbon | |
| 7,493,726 | B2 | 2/2009 | Fitzgibbon | |
| 7,498,936 | B2 | 3/2009 | Maeng | |
| 7,532,965 | B2 | 5/2009 | Robillard | |
| 7,561,075 | B2 | 7/2009 | Fitzgibbon | |
| 7,600,550 | B2 | 10/2009 | Mays | |
| 7,616,090 | B2 | 11/2009 | Baker | |
| 7,708,048 | B2 | 5/2010 | Mays | |
| 7,724,687 | B2 | 5/2010 | Autret | |
| 7,741,951 | B2 | 6/2010 | Fitzgibbon | |

(56) References Cited

U.S. PATENT DOCUMENTS 7,761,186 B2 7/2010 Keller
7,778,604 B2 8/2010 Bauman
7,783,018 B1 8/2010 Goldberg
7,852,212 B2 12/2010 Fitzgibbon
7,853,221 B2 12/2010 Rodriguez
7,856,558 B2 12/2010 Martin
7,876,218 B2 1/2011 Fitzgibbon
7,983,180 B2 7/2011 Harrington
7,994,896 B2 8/2011 Fitzgibbon
7,995,460 B2 8/2011 Edgar, III
8,014,528 B2 9/2011 Bunte
8,040,217 B2 10/2011 Fitzgibbon
8,063,592 B2 11/2011 Shier
8,144,011 B2 3/2012 Fitzgibbon
8,175,591 B2 5/2012 Fitzgibbon
8,207,818 B2 6/2012 Keller, Jr.
8,239,481 B2 8/2012 Alexander
8,290,515 B2 10/2012 Staton
8,368,509 B2 2/2013 Fitzgibbon
8,416,054 B2 4/2013 Fitzgibbon
8,421,591 B2 4/2013 Karasek
8,423,788 B2 4/2013 Holtzman
8,544,523 B2 10/2013 Mays
8,577,392 B1 11/2013 Pai
8,587,404 B2 11/2013 Laird
8,797,138 B2 8/2014 Myers
8,868,220 B2 10/2014 Crucs
2001/0011941 A1 8/2001 King
2001/0017483 A1 8/2001 Frohberg
2002/0014954 A1 2/2002 Fitzgibbon
2002/0033760 A1 3/2002 Kobayashi
2002/0067308 A1 6/2002 Robertson
2002/0162175 A1 11/2002 Berglund
2002/0178385 A1 11/2002 Dent
2002/0180582 A1 12/2002 Nielsen
2002/0180600 A1 12/2002 Kirkland
2002/0183008 A1 12/2002 Menard
2003/0016119 A1 1/2003 Teich
2003/0016139 A1 1/2003 Teich
2003/0018478 A1 1/2003 Mays
2003/0023881 A1 1/2003 Fitzgibbon
2003/0029579 A1 2/2003 Mays
2003/0043021 A1 3/2003 Chung
2003/0097586 A1 5/2003 Mok
2003/0098778 A1 5/2003 Taylor
2003/0118187 A1 6/2003 Fitzgibbon
2003/0151493 A1* 8/2003 Straumann et al. .......... 340/5.25
2003/0182132 A1 9/2003 Niemoeller
2003/0193388 A1 10/2003 Ghabra
2003/0216139 A1 11/2003 Olson
2003/0222754 A1 12/2003 Cho
2004/0012481 A1 1/2004 Brusseaux
2004/0012483 A1 1/2004 Mays
2004/0036573 A1 2/2004 Fitzgibbon
2004/0176107 A1 9/2004 Chadha
2004/0210327 A1* 10/2004 Robb ........................ E06B 9/68 700/90
2004/0212498 A1 10/2004 Peterson
2004/0239482 A1 12/2004 Fitzgibbon
2004/0257189 A1 12/2004 Chang
2004/0257199 A1 12/2004 Fitzgibbon
2005/0012631 A1 1/2005 Gregori
2005/0030179 A1 2/2005 Script
2005/0033641 A1 2/2005 Jha
2005/0035873 A1 2/2005 Kimura
2005/0044906 A1 3/2005 Spielman
2005/0076242 A1 4/2005 Breuer
2005/0085248 A1 4/2005 Ballay
2005/0088281 A1 4/2005 Rohrberg
2005/0099299 A1 5/2005 Tyroler
2005/0110639 A1 5/2005 Puzio
2005/0113080 A1* 5/2005 Nishimura ......... G07C 9/00103 455/420
2005/0134426 A1 6/2005 Mullet
2005/0146417 A1 7/2005 Sweatte
2005/0170777 A1 8/2005 Harwood
2005/0174250 A1 8/2005 Dierking
2005/0195066 A1 9/2005 Vandrunen
2005/0242923 A1 11/2005 Pearson
2005/0245233 A1 11/2005 Anderson
2005/0258937 A1 11/2005 Neuwirth
2005/0272372 A1 12/2005 Rodriguez
2005/0273372 A1 12/2005 Bowne
2006/0038656 A1 2/2006 Wilson
2006/0056663 A1 3/2006 Call
2006/0077035 A1 4/2006 Mamaloukas
2006/0091998 A1 5/2006 Fitzgibbon
2006/0103503 A1 5/2006 Rodriquez
2006/0132284 A1 6/2006 Murphy
2006/0137261 A1 6/2006 Maly
2006/0145811 A1 7/2006 Nantz
2006/0147052 A1 7/2006 Wikel
2006/0153122 A1 7/2006 Hinman
2006/0158344 A1 7/2006 Bambini
2006/0164208 A1 7/2006 Schaffzin
2006/0187034 A1 8/2006 Styers
2006/0214783 A1 9/2006 Ratnakar
2006/0220785 A1 10/2006 Ferdman
2006/0223518 A1* 10/2006 Haney ............... H04M 1/72519 455/420
2006/0261932 A1 11/2006 Ando
2006/0279399 A1 12/2006 Chuey
2007/0005605 A1 1/2007 Hampton
2007/0005806 A1 1/2007 Fitzgibbon
2007/0028339 A1 2/2007 Carlson
2007/0046428 A1 3/2007 Mamaloukas
2007/0058811 A1 3/2007 Fitzgibbon
2007/0116194 A1 5/2007 Agapi
2007/0146118 A1 6/2007 Rodriguez
2007/0159301 A1 7/2007 Hirt
2007/0171046 A1 7/2007 Diem
2007/0177740 A1* 8/2007 Nakajima .......... G06F 21/6218 380/277
2007/0183597 A1 8/2007 Bellwood
2007/0185597 A1 8/2007 Bejean
2007/0290792 A1 12/2007 Tsuchimochi
2008/0061926 A1 3/2008 Strait
2008/0092443 A1 4/2008 Herman
2008/0106370 A1 5/2008 Perez
2008/0108301 A1 5/2008 Dorenbosch
2008/0130791 A1 6/2008 Fitzgibbon
2008/0132220 A1 6/2008 Fitzgibbon
2008/0224886 A1* 9/2008 Rodriguez ......... G07C 9/00182 340/13.28
2008/0303706 A1 12/2008 Keller
2009/0005080 A1 1/2009 Forstall
2009/0063293 A1 3/2009 Mirrashidi
2009/0064056 A1 3/2009 Anderson
2009/0102651 A1 4/2009 Fitzgibbon
2009/0160637 A1 6/2009 Maeng
2009/0273438 A1 11/2009 Sultan
2009/0302997 A1* 12/2009 Bronstein ............... H04L 9/321 340/5.54
2009/0315751 A1 12/2009 Bennie
2010/0120450 A1 5/2010 Herz
2010/0141381 A1* 6/2010 Bliding .............. G07C 9/00309 340/5.61
2010/0141514 A1 6/2010 Bell
2010/0242360 A1 9/2010 Dyas
2010/0242369 A1* 9/2010 Laird .................... E05F 15/684 49/358
2010/0289661 A1 11/2010 Styers
2010/0297941 A1 11/2010 Doan
2010/0299517 A1 11/2010 Jukic
2011/0025456 A1 2/2011 Bos
2011/0055909 A1* 3/2011 Dowlatkhah ............ G06F 21/31 726/6
2011/0084798 A1 4/2011 Fitzgibbon
2011/0109426 A1* 5/2011 Harel et al. .................... 340/5.6
2011/0130134 A1* 6/2011 Van Rysselberghe ....... A47G 29/141 455/422.1
2011/0193700 A1 8/2011 Fitzgibbon
2011/0205013 A1 8/2011 Karasek

(56) References Cited

U.S. PATENT DOCUMENTS

| | | | | |
|---|---|---|---|---|
| 2011/0234367 | A1 | 9/2011 | Murphy | |
| 2011/0254685 | A1 | 10/2011 | Karasek | |
| 2011/0258076 | A1 | 10/2011 | Muirbrook | |
| 2011/0311052 | A1 | 12/2011 | Myers | |
| 2011/0316667 | A1 | 12/2011 | Tran | |
| 2012/0098638 | A1 * | 4/2012 | Crawford | 340/5.6 |
| 2012/0188054 | A1 | 7/2012 | Bongard | |
| 2012/0249289 | A1 | 10/2012 | Freese | |
| 2012/0280783 | A1 | 11/2012 | Gerhardt | |
| 2012/0280789 | A1 | 11/2012 | Gerhardt | |
| 2012/0280790 | A1 | 11/2012 | Gerhardt | |
| 2013/0060357 | A1 | 3/2013 | Li | |
| 2013/0060358 | A1 | 3/2013 | Li | |
| 2013/0093563 | A1 * | 4/2013 | Adolfsson | G07C 9/00031 340/5.7 |
| 2013/0147600 | A1 | 6/2013 | Murray | |
| 2013/0151977 | A1 | 6/2013 | Arteaga-King | |
| 2013/0257589 | A1 | 10/2013 | Mohiuddin | |
| 2013/0290191 | A1 * | 10/2013 | Dischamp | H04L 63/061 705/51 |
| 2013/0328663 | A1 | 12/2013 | Ordaz | |
| 2014/0184393 | A1 | 7/2014 | Witkowski | |
| 2014/0253285 | A1 | 9/2014 | Menzel | |
| 2014/0266573 | A1 | 9/2014 | Sullivan | |
| 2015/0221147 | A1 | 8/2015 | Daniel-Wayman | |

FOREIGN PATENT DOCUMENTS

| | | | |
|---|---|---|---|
| EP | 846991 | | 6/1998 |
| EP | 0913979 | A2 | 5/1999 |
| EP | 1151598 | | 6/2000 |
| EP | 1227027 | | 7/2002 |
| FR | 002989799 | * | 10/2013 |
| GB | 2404765 | | 2/2005 |
| JP | 2002019548 | | 1/2002 |
| JP | 2004088774 | | 3/2004 |
| JP | 4864457 | | 2/2012 |
| KR | 2002032461 | | 5/2002 |
| WO | 9012411 | | 10/1990 |
| WO | 9515663 | A1 | 6/1995 |
| WO | 9923614 | | 5/1999 |
| WO | 0036812 | | 6/2000 |
| WO | 0193220 | | 12/2001 |
| WO | 02075542 | | 9/2002 |
| WO | 2009088901 | | 7/2009 |
| WO | 2011055128 | | 5/2011 |

OTHER PUBLICATIONS

Examination Report Dated Apr. 3, 2012 issuing from New Zealand Patent Application No. 599055.

George Lawton; "Dawn of the Internet Appliance" Computer, Industry Trends; Oct. 1, 1997.

Hassan A. Artail; "A Distributed System of Network-Enabled Microcontrollers for Controlling and Monitoring Home Devices" IEEE 2002.

Ian Bryant and Bill Rose; "Home Systems: Home Controls;" p. 1-322; © 2001 Parks Associates.

K.K. Tan, Y.L. Lim and H.L. Goh; "Remote Adaptive Control and Monitoring" IEEE (c) 2002.

Kurt Scherf, Michael Greeson and Tricia Parks; "Primary Perspectives: "E-Enabled" Home Security;" pp. 1-87; © 2003 Parks Associates.

Peter M. Corcoran and Joe Desbonnet; "Browser-Style Interfaces to a Home Automation Network" Manuscript received Jun. 18, 1997, IEEE (c) 1997.

Summary of Findings From Parks Associates\ Early Reports; pp. 9-13; Apr. 15, 2013 by Parks Associates.

Susan Cotterell, Frank Vahid, Walid Najjar, and Harry Hsieh; "First Results with eBlocks: Embedded Systems Building Blocks" University of California, Rkverside pp. 168-175; Codes+ISSS'03, Oct. 1-3, 2003.

Examination Report Under Section 18(3) for GB1205649.5 Dated Feb. 12, 2014.

"Now You Can Close Your Garage Door With a Smartphone;" Copyright 2011 USA Today; http://content.usatoday.com/communities/driveon/post/2011/09/now-you-can-control-your-garage-door-from-your-smartphone.

4Sight Internet Brochure; http://4sightsolution.4frontes.com/document/4CB-4500-0809; Carrollton, TX; 2009; 5 pgs.

828LM—LiftMaster Internet Gateway; http://www.liftmastercom/consumerweb/pages/accessoriesmodeldetaiLaspx?modelId=2407; printed Oct. 30, 2012.

ActieHome PC Home Automation System; http://www.x10.com/promotions/sw31a_activehome_hmp.html?WENTY11; accessed Sep. 2011.

Arrayent; White Paper: Six System Requirements for an Internet-Connected Product Line; Copyright 2010; http://arrayent.com/pdfs/SixSystemRequirementsforInternetConnectedProductsLine.pdf.

Automatic Garage Door Closer Manual—Protectrix 18A—Dated Mar. 31, 2009.

Combined Search and Examination Report Cited in British Patent Application No. GB1025649.5 Dated Aug. 8, 2012.

Examination Report from New Zealand Patent Application No. 599055 dated Apr. 3, 2012.

Examination Report Under Section 18(3) Cited in British Patent Application No. GB1205649.5 Dated May 29, 2013.

EZSrve-Insteon/X10 Home Automation Gateway—Model #5010L; hap://www.simplehomenet.com/proddetail.asp?prod+9357342317, accessed Sep. 2011.

Fully-Loaded ActiveHome Pro PC Hom Automation System; http://www.x10.com/promotions/cm15a_loaded_ps.html ; accessed Sep. 2011.

Hawking Technologies HomeRemote Wireless Home Automation Gateway Pro Starter Kit; The HRGZ2 HomeRemote Gateway; Smart Home Systems, Inc.; http://www.smarthomeusa.com/ShopByManufacturer/Hawking-Technologies/Item/HRPS1/; Accessed Sep. 2011.

HomeRemote Wireless Home Automation Gateway—PracticallyNetworked.com; Review date Aug. 2007; http://222.practicallynetworked.com/review.asp?pid=690; Accessed Sep. 2011.

HomeSeer HS2—Home Automation Software; http://store.homeseer.com/store/HomeSeer-HS2-Home-Automation-Software-Download-P103.aspx; Accessed Sep. 2011.

How to Internet-Connect Your Low Cost Consumer Retail Embedded Design; How to Prototype an Internet Connect Product; Hershy Wanigasekara; Sep. 13, 2010; http://www.eetimes.com/design/embedded/4027637/Internet-Connect-your-low-cost-consumer-retail-embedded-design.

How to Internet-Connect Your Low Cost Consumer Retail Embedded Design; How to Prototype an Internet Connected Product; Hershy Wanigasekara; Sep. 13, 2010; http://www.eetimes.com/design/embedded/4027637/Internet-Connect-your-low-cost-consumer-retail-embedded-design.

How to Internet-Connect Your Low Cost Consumer Retail Embedded Design; Internet Connect Product Implementation Design Patterns; Hershy Wanigasekara; Sep. 13, 2010; http://www.eetimes.com/design/embedded/4027637/Internet-Connect-your-low-cost-consumer-retail-embedded-design.

Infinias Mobile Credential App for Android DroidMill; Known and printed as early as Dec. 19, 2011; http://droidmill.com/infinias-mobile-credential-1364120.html.

Intelli-M eIDC32; Ethernet-Enabled Integrated Door Controller; www.infinias.com; Known and printed as early as Dec. 19, 2011.

Internet Connected Garage Door Opener; Open New Doors at Sears; http://www.sears.corri/shc/s/p_10153_12605_00930437000P?prdNo=l&blockNo=1&blockType=G1; printed Oct. 30, 2012.

Kenmore Connect; http:/www.kenmore.com/shc/s/dap_10154_12604_DAP_Kenmore+Connect; 2010 Sears Brands, LLC.

LiftMaster; MyQ Enabled Accessory: LiftMaster Internet Gateway (Model 828); Known as of Dec. 19, 2011.

(56) References Cited

OTHER PUBLICATIONS

Liftmaster Debuts New Intelligence in Garage Door Openers at IDS 2011; New Generation of LiftMaster Models and Accessories Enabled by MyQ Technology; Elmhurst, IL; Jun. 7, 2011; http://www.liftmaster.com/NR/rdonlyres/0A903511-21AB-4F0A-BBCD-196D41503CF2/4305/LiftMasterUneilsMyQTechnologyIDA2011_FINAL.pdf.

LiftMaster Internet Gateway: Your Simple Solution to Home Control; http://www.liftmaster.com/consumerweb/products/IntroducingLiftMasterInternetGateway, printed Oct. 30, 2012.

MiCasa Verde.com—Vers2; http://www.micasaverde.com/vera.php; Accessed Sep. 2011.

Miele's Remote Vision Explained; http://www.miclensa.com/service/remote_vision/verify.aspx; Accessed Feb. 2012.

Press Release; Kenmore Uneils Reolutionary Technology Enabling Laundry Applicances to 'Talk' to Customer Serice Experts; PR Newswire, pNA, Aug. 4, 2010.

Protectrix Wireless automatic Garage Door Closer Timer Opener Security Accessory; http://www.closethegarage.com; printed Oct. 30, 2012.

Somfy's Slick Tahoma Z-Wire and RTS Home Automatation Gateway; Thomas Ricker; posted Jan. 4, 2011; http://www.engadget.com/2011/01/04/softys-tahoma-z-wave-and-rts-home-automation-gateway/.

Stephen Shankland; "Need to lend your key? E-Mail it, Frauhofer says" news.cnet.com/8301-1035_3-57572338-94/need-to-lend-your-key-e-mail-it-fraunhofer-says/; pp. 1-5; CNET News, Mar. 4, 2013.

The Craftsman Brant Announces Garage Door Opener of the Future—PR Newswire; The Sacramento Bee; http://www.sac bee.com/2011/09/27/2941742/the-craftsman-brand-announces.html; Sep. 27, 2011.

The Intelli-M eIDC32; True IP Access Control; htto://www.infinias.com/main/Products/eIDCController.aspx; Known and printed as early as Dec. 19, 2011.

ULStandard for Safety for Door, Drapery, Gate, Louver, and Window Operators and Systems, UL 325 Fifth Edition, Dated Jun. 7, 2002; pp. 1-186.

Universal Devices—ISY-99i Series; http://www.universal-devices.com/99i.htm; Accessed Sep. 2011.

Wayne-Dalton Press Area—New Z-Wave enabled prodrive; http://www.wayne-dalton.com/newsitem98.asp; dalton.com/newsitem98.asp; Printed Oct. 13, 2011.

www.brinkshomesecurity.com/home-security-systems-and-pricing/security-equipment/security-equipment.htm as printed on Feb. 11, 2009.

Xanboo XPC280 Wireless Universal Garage Door Control—Smarthome; http://www.smarthome.comf75066/Xanboo-XPC280-Wireless-Universal-Garage-Door-Control/p.aspx, printed Oct. 30, 2012.

Canadian Patent Application No. 2,533,795; Second Office Action Dated Dec. 30, 2013.

Examination Report Under Section 18(3) for GB1205649.5 Dated Jun. 11, 2014.

4th Usenix; Windows Systems Symposium; Seattle, Washington USA; Aug. 3-4, 2000; A Toolkit for Building Dependable and Extensible Home Networking Applications; Yi-Min Wang, Wilf Russell and Anish Arora.

6POWER, IPv6 and PLC for home automation; Terena 2004; Jordi Palet & Francisco Ortiz.

Authentication vs. Encryption; Be in Control with Control Networks; Feb. 10, 2004; http://www.buildings.com/DesktcpModulesIBB ArlicleMaxfArticleDeta I/BBArticleDetai I Printaspx7ArlicleID=1740& Template=standm-d_Pri nt.ascx &siteID=1.

Big blue builds home network technology; McCune, Heather; http://search.proquest.com/docview/194229104?accountid=12492; Apr. 2003.

Controlling the Status Indicator Module of the Stanley Garage Door Opener Set; Rene Braeckman; Apr. 6, 2000.

Detroit Free Press Home Computing Column; Detroit Free; Newman, Heather; http ://search.proquest.com/docview/4632707 4 7?accountid=12492; Knight Ridder/Tribune Business News; © 2002, last updated Dec. 13, 2011.

Diomidis D. Spinellis; The information furnace: consolidated home control; Received: Jun. 1, 2002 / Accepted: Aug. 14, 2002; © Springer-Verlag London Limited 2003.

Doug Olenick; Motorola Broadens Home Automation Line; http ://search.proquest.com/docview/232255560?accountid=12492; vol. 20, © Jan. 6, 2005; last updated Sep. 1, 2011.

International Conference on Sensors and Control Techniques (IeSC 2000); Desheng Jiang, Anbo Wang, Fume and Temperature Alarm and Intelligent Control System of the District for Fire-Proof, Jun. 19-21, 2000, Wuhan, China, vol. 4077.

Memorandum in Support of Defendant\s Motion to Dismiss Second Amended Complaint Due to Patent Invalidity Under 35 U.S.C. § 101; NDIL Case 14-cv-05197; Exhibit A; U.S. Pat. No. 6,998,977; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit B; U.S. Pat. No. 7,852,212; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit C; U.S. Pat. No. 8,144,011; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit D; U.S. Pat. No. 7,876,218; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit E; U.S. Pat. No. 7,482,923; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit F; U.S. Pat. No. 7,071,850; Mar. 17, 2015.

Memorandum in Support of Defendant\s Motion to Dismiss Second Amended Complaint Due to Patent Invalidity Under 35 U.S.C. § 101; NDIL Case 14-cv-05197; Exhibit G; Dictionary of Computer and Internet Terms; Douglas Downing; Michael A. Covington and Melody Mauldin Covington; Barrons; Mar. 17, 2015.

Net2 User Manual; Version 3; Paxton Access; "Date code: 281002".

Search History; C:\APPS\EAST\workspaces\garage_door_status_indicator.wsp; p. 4, Apr. 25, 2005.

Secure Smart Homes using• Jini and UIUC SESAME; Jalal Al-Muhtadi et al.; 1063-9527/00 © 2000 IEEE.

Security System Installation Manual; Caretaker and Custom Versions; Interactive Technologies, Inc.; Issue Date May 5, 1994.

Security System Installation Manual; Caretaker and Custom Versions; Interactive Technologies, Inc.; Text No. 46-908-01 Rev. A; 1995.

Smart Networks for Control; Reza S. Raji;IEEE Spectrum Jun. 1994.

Svein Anders Tunheim; Wireless Home Automation Systems Require Low Cost and Low Power RF-IC Solutions; Wireless Home Automation Systems (rev. 1.0) May 16, 2002; p. 1 of 8.

The iDorm—a Practical Deployment of Grid Technology; Anthony Pounds -Cornish, Arran Holmes; Intelligent Interactive Environments Group, University of Essex, UK; Proceedings of the 2nd IEEE/ACM International Symposium on Cluster Computing and the Grid (CCGRIO'02) 0-7695-1582-7/02 © 2002 IEEE.

The Information Furnace: Consolidated Home Control; Diomidis D. SpinellisDepartment Management Science and Technology Athens University of Economics and Business; Personal and Ubiquitous Computing archive; vol. 7 Issue 1, May 2003.

The Information Furnace: User-friendly Home Control; Diomidis D. Spinellis, Department Management Science and Technology, Athens University of Economics and Business; SANE 2002; 3rd Int'l Sys. Admin. and Networking Conf. Proc., pp. 145-175, May 2002.

(56) References Cited

OTHER PUBLICATIONS

Towards Dependable Home Networking: An Experience Report; Yi-Min Wang, Wilf Russell, Anish Arora, JunXu, Rajesh K. Jagannathan, Apr. 18, 2000, Technical Report, MSR-TR-2000-26, Microsoft Research, Microsoft Corporation.

Xanboo Future Product; http://www.xanboo.com/xanproducts/newproducts.htm Feb. 2002, Xanboo Inc.

XPress Access; Simple Personal Management; © 2001 Andover Controls Corporation BR-XPACCESS-A.

New Zealand Application No. 706180; First Examination Report Dated Apr. 10, 2015.

British Combined Search and Examination Report Under Section 17 and 18(3) from British Application No. GB0713690.6 Dated Oct. 17, 2007.

British Search Report Under Section 17 Dated Dec. 20, 2007 for Application No. GB0713690.6.

European Patent Application No. EP 1 280 109 A3; European Search Report Dated: Aug. 1, 2005.

International Search Report and Written Opinion for PCT/US2014/057405 Dated Dec. 17, 2014.

James Y. Wilson and Jason A. Kronz; Inside Bluetooth Part II, Dr. Dobb's Portal; The World of Software Development; Dr. Dobb's Journal; Jul. 22, 2001; 9 pages.

Sensory, Inc. RSC-300/364 Data Book, Jan. 2001 (55 pages).

* cited by examiner

CONTROL DEVICE ACCESS METHOD AND APPARATUS

FIELD

The present application relates to movable barriers such as overhead doors and the like, particularly barrier operators in which a drive force is applied to the overhead door by a motor.

BACKGROUND

Providing guest or other third party access to a premises secured by a movable barrier can present numerous difficulties. If an owner or operator of the premises is present, the owner can actuate the operator and provide access to the guest, but this can inconvenience the owner if the owner is in a meeting or otherwise busy. Access can become even more difficult when an owner is absent from the premises.

Wireless transmitters are commonly used to send signals to barrier operators to open and close movable barriers associated with the barrier operators. In order for a guest to obtain access with such a transmitter, however, an absent owner, or someone at the behest of the owner, would have to physically deliver one of the wireless transmitters to the guest. This situation can undesirably waste time and resources. Moreover, this can leave an owner without a wireless transmitter if there are a limited amount of transmitters available and requires the owner to reacquire the wireless transmitter from the guest.

Another method of actuating a barrier operator includes providing a stationary keypad or other interface outside of the premises that can open and close a movable barrier upon entry of the appropriate code. With such a setup, an owner can provide a guest with the appropriate code. This enables the owner to provide access to the premises without additional expenditures of time or resources, but disadvantageously also enables the guest to reenter the premises so long as the code remains the same. Thus, if the owner wishes to prevent the guest from being able to reenter the premises, the owner must change and memorize a new code. Such a setup can become onerous with multiple guests needing access to the premises.

SUMMARY

A method, apparatus, mobile device application software, and computer-readable medium is provided herein that allows an owner or operator of a secured area within a premises to send control device access rights to a guest over a communication network. Pursuant to this, the owner can send, or cause to be sent by a third party device, such as a server device, an application to a mobile computing device or telephone device that is configured to be operated on the mobile device. The application includes information necessary to access and operate the control device at the premises, such as a movable barrier operator, monitoring device, home automation device, and/or alarm device. As such, after receiving the transmission of the application at the guest mobile device, the application can then be installed and/or run on the mobile device. The application can advantageously be configured by the owner of the premises to restrict the access rights granted by the application. For example, the application can restrict access rights of the guest mobile device to a specific time period on one day, certain time periods for a number of days, certain days during a week, etc. Moreover, the application can provide increased security by including a notification configuration to notify the owner or other responsible party if the guest mobile device attempts to operate the control device outside of these sets time periods.

BRIEF DESCRIPTION OF THE DRAWINGS

For the purpose of facilitating an understanding of the subject matter sought to be protected, there are illustrated in the accompanying drawings embodiments thereof, from an inspection of which, when considered in connection with the following description, the subject matter sought to be protected, its construction and operation, and many of its advantages should be readily understood and appreciated.

DETAILED DESCRIPTION

Figure 1:
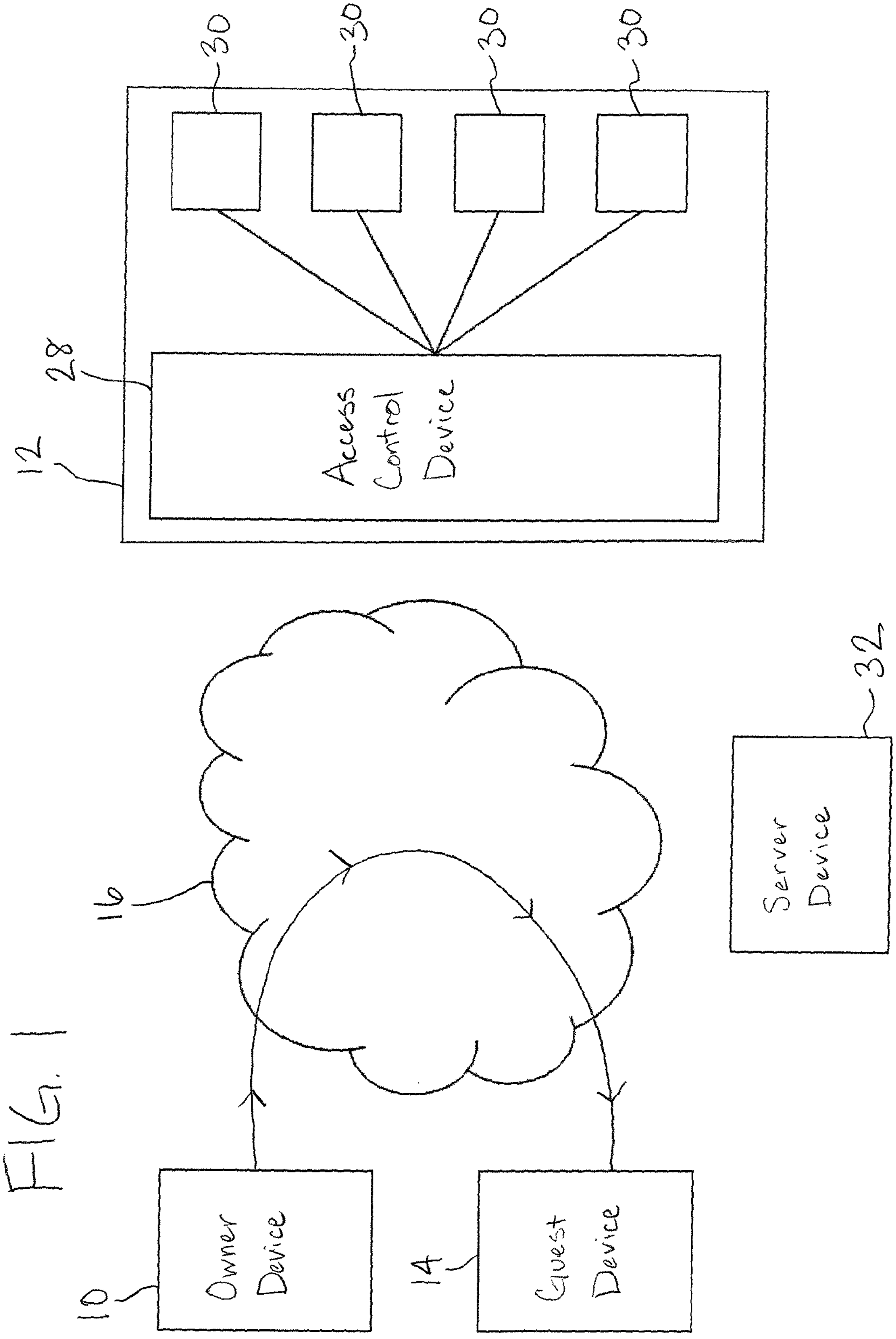
FIG. 1 is a schematic diagram showing communication to send access rights to a guest device from an owner device to the guest device.

Application software for a mobile device can provide an owner or operator of a premises with the ability to remotely grant a guest authorization to access an access control device on or in the premises. The access control device can control the operation of the one or more secondary devices, so that with the owner authorization, the guest can access the access control device to cause an action at the premises with the secondary device. The application software can further provide the owner/operator the ability to restrict the third party access, such as temporally or spatially.

The following terms, which will be used throughout the disclosure herein, can have a variety of suitable meanings. For example, when used herein, an "owner" of a premises or secured area can refer to any person with the authority to authorize a guest to access the access control device on a premises or secured area. In a straightforward situation, the owner can personally own the premises, such as with a home or business, and has the authority to authorize access to a guest, such as an independent contractor, employee, customer, or personal acquaintance. The disclosure herein, however, works equally well, with an example of a corporation or other business having any number of employees. In this situation, the owner would refer to a person in a position of authority, such as a CEO, president, vice-president, manager, security personnel, and the like. Without limitation, the disclosure herein can provide an owner of a premises having an access control device therein the ability to remotely grant a guest access to and the ability to send a control signal to the access control device. Similarly, "premises" can refer to a residential structure, commercial structure, industrial structure, or other secured area, or portion(s) thereof.

Details of the interacting components and structure of the system disclosed herein are shown in FIGS. 1-12. As illustrated, an owner operated communication device 10, a guest operated communication device 14, a server device 32, and an access control device 28 are capable of communication with one another through one or more communication networks 16. Suitable communication networks 16 can include, without limitation, the internet, a cellular network, Bluetooth, or other communication medium, or a combination thereof. The owner device 10 and guest device 14 can be any suitable communication device, such as a mobile phone, tablet, computing device, E-reader, communication enabled vehicle, or the like.

Figure 12:
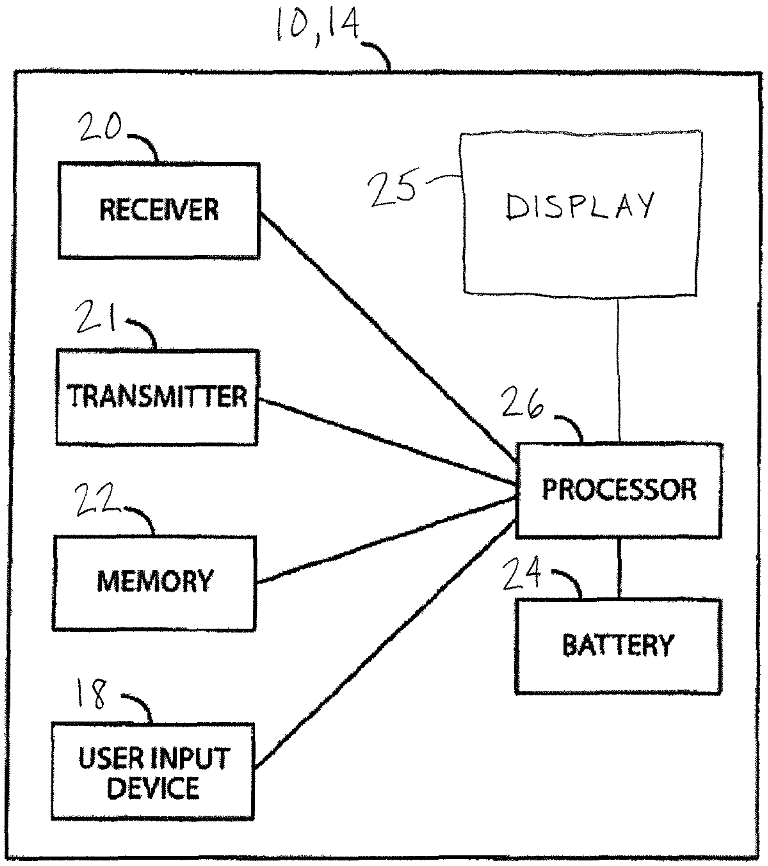
FIG. 12 is a block diagram of a communication device suitable for an owner device or a guest device.

As shown in FIG. 12, the owner device 10 and the guest device 14 each include a user input 18, such as a touch screen, keypad, switch device, voice command software, or the like, a receiver 20, a transmitter 21, a memory 22, a power source 24, which can be replaceable or rechargeable as desired, a display 25, and a processing device 26 controlling the operation thereof. As commonly understood, the components are connected by electrical pathways, such as wires, traces, circuit boards, and the like.

The access control device 28 is located in or around a premises or secured area 12. The access control device 28 is configured, upon receipt of a properly authorized control signal, to control operation of one or more secondary devices 30 in or on the premises 12. By a first approach, the access control device 28 can be part of or integrated within the secondary device 30. For example, without limitation, the secondary device 30 can refer to a movable barrier operator, such as a garage door operator, door access control, gate operator, commercial door operator, and the like, a home automation system, an alarm system, a server device, a computing device, a network device, or the like. In this approach, the access control device 28 can directly receive the control signal to open or close a movable barrier, lock or unlock one or more doors, activate or deactivate appliances, lights, and the like within the premises 12, activate or deactivate an alarm, and the like.

By a second approach, the access control device 28 can be a separate gateway device capable of receiving the authorized control signal and translating the signal to a language understood by one of the specific secondary devices 30 as discussed above.

Turning now to details of the application software ("application"), the application can be available for purchase and/or download from any website, online store, or vendor over the communication network 16. Alternatively, a user can download the application onto a personal computer and transfer the application to a suitable device. In this instance, the owner downloads and installs the application on the owner device 10. When operation is desired, the owner runs the application on the owner device 10 by a suitable selection through the user input 18.

The application utilizes access rights data that includes identification information of the access control device 28 and corresponding authorization information for access rights to the access control device 28. In other words, the access rights data includes credentials required by the access control device 28, a conditional requirement for allowing the credentials, and the identification information of the access control device 28. If desired, the application can cause the access rights data to be stored in the memory 22 of the owner device 10. This information can be manually entered by the owner through the user input 18 of the owner device 10, by download from the access control device 28, by retrieving or receiving the access rights data from a network device, or the application can have a learn mode similar to a learning transmitter known in the art so that the owner device 10 receives and stores the information from a transmission of an authorized transmitter. Thus, if desired, the application can provide the owner with transmitter functionality to send an authorized control signal to the access control device 28 with the owner device 10.

Advantageously, the application further grants the owner the ability to send the access rights data to one or more guest devices 14. In other words, upon instruction of the owner through the application, the application can transmit the access rights data or cause the access rights data to be transmitted to the guest device 14, which then provides the guest device 14 the ability to send an authorized control signal to the access control device 28 to operate the secondary devices 30.

The guest can acquire the application in any number of suitable ways. For example, the owner can cause an invitation or link to download and install the application to be sent to the guest device 14 through a suitable communication network, utilizing a short message service, a multimedia message service, an e-mail, a message through a third party website, or the like. This can be done by the owner with the owner device 10 through the application or independent thereof or can be done by the owner through a third party website or service. The owner can also vocally communicate with the guest with an identification and location of the application for the guest to download and install the application on the guest device 14.

Regardless of how the guest is notified of the application, the guest can then purchase, if necessary, download, and install the application on the guest device 14 similar to the operation of the owner device 10 discussed above. With the application installed on the guest device 14, the application can cause the guest device 14 to be receptive to a transmission at the behest of the owner device 10, which includes the access rights data. For example, the owner can input guest device identification information, such as a telephone number, email address, IP address, or the like, into the owner device 10 or an associated third party website and select to transmit the access rights data to the guest device 14, the communication of which will be described in greater detail below.

Upon reception of the access rights data from the owner device 10, the application running on the guest device 14 can then configure the guest device 14 to send an authorized control signal to the access control device 28 to allow the guest to operate the secondary device(s) 30. In one approach, the guest can instruct the application running on the guest device 14 to be receptive to the access rights data, such as in a learning mode, download the access rights data, such as from a third party server device, and/or store the access rights data in the memory 22. In another approach, the application can automatically store the access rights data in the memory 22 of the guest device 14. Then, when the guest desires access to the access control device 28, the guest can run the application on the guest device 14, which can retrieve the access rights data and transmit an authorized control signal through the guest device transmitter 21 to the access control device 28, such as through Bluetooth, a cellular network, the internet, or the like.

Specifically, the application can display a menu listing one or more premises by an identifier, such as an address, title, or the like, which can be customizable or editable, on the display 25 of the guest device 14. Upon selection of the premises in the listing through the user input 18, the application determines whether any restrictions on the access rights are applicable. If there are no restrictions applicable, upon selection with the user input 18, the application can cause the transmitter 21 of the guest device 14 to transmit the authorized control signal to the access control device 28.

Alternatively, the application can prevent selection of the premises listing due to restrictions being applicable. For example, the application can display the premises listing in a grayed-out state, crossed-out, or the like. Additionally, the application can display the restrictions alongside or within the premises listing.

So configured, the owner can grant access rights to the guest without having to give the guest a physical key, a pass code, or having to be present to grant access. Moreover, the access rights data transmission, as well as the storage of the access rights data, can be encrypted by any suitable methods so that unwanted third parties and the guest cannot use the transmission or the application to gain unrestricted or uncontrolled access to the access rights data. Any suitable encryption scheme and method can be utilized. As such, the owner maintains control over access because the guest cannot make unauthorized copies, such as with a physical key, or share access with unauthorized people, such as with a pass code.

Advantageously, the application can also be used by the owner to restrict usage of the access rights sent to the guest device. Specifically, the application can allow the owner to enter restrictions on the access rights granted to the guest device 14, including, temporal restrictions, spatial restrictions, or combinations thereof. For example, if the access control device 28 controls the locking and unlocking of a door, the restrictions can prevent the guest device 14 from being able to unlock the door during specified times, such as specified hours of a day, one or more days during a week, or combinations thereof. In another example, if the premises 12 includes a series of locked doors, the restrictions can prevent the guest device 14 from being able to unlock specified doors so that the guest can only access selected areas of the premises.

The owner can input these restrictions or conditions into the application prior to the access rights data being sent to the guest device 14 so that the access rights data is sent with the restrictions to the guest device 14. As such, the application running on the guest device can restrict transmission of an authorized signal or can transmit the signal along with the restrictions configured to be interpreted by the access control device 28 to permit or deny the requested action based on analysis of the restrictions. Alternatively or in addition thereto, the owner can subsequently modify already granted access rights by inputting the restrictions into the owner device 10 and sending the restrictions or causing the restrictions to be sent to the guest device 14 to alter the authorized access rights stored on the guest device 14. By another approach, the owner device 10, can send the restrictions or conditions directly to the access control device 28. As such, the access control device 28 can access restrictions upon reception of a signal from the guest device 14 and permit or deny the requested action based on the restrictions. By yet another approach, the owner device 10 can input the restrictions or conditions at an intermediary server 32, discussed in more detail below, or send the restrictions thereto. As such, the intermediary server 32 then controls the conditions placed on the authorization of the guest device to send signals to the access control device 28.

By another approach, the access rights can be sent to the guest device without any authorization for use. As such, the owner can subsequently send allowed or authorized spatial or temporal zones to the guest device or intermediary server 32, or identify the allowed or authorized spatial or temporal zones for subsequent sending by a third party.

Of course, the application also allows the owner to revoke the access rights, such as by sending a revocation transmission to the application on the guest device 14 or to a third party server device or service, which would then deactivate or delete the access rights data from the guest device 14.

The various options for transmitting the access rights from the owner device 10 to the guest device 14 are described below with reference to FIGS. 1-6.

In a first example, shown in FIG. 1, the owner device 10 communicates directly with the guest device 14 through the communication network, as discussed above. As such, the owner device 10 transmits the access rights data, with or without restrictions thereon as determined by the owner, directly to the guest device 14 by inputting identification information of the guest device 14, such as a telephone number, email address, IP address, SIM card, or the like into the owner device 10. The application then transmits the access rights data directly to the guest device 14.

Figure 2:
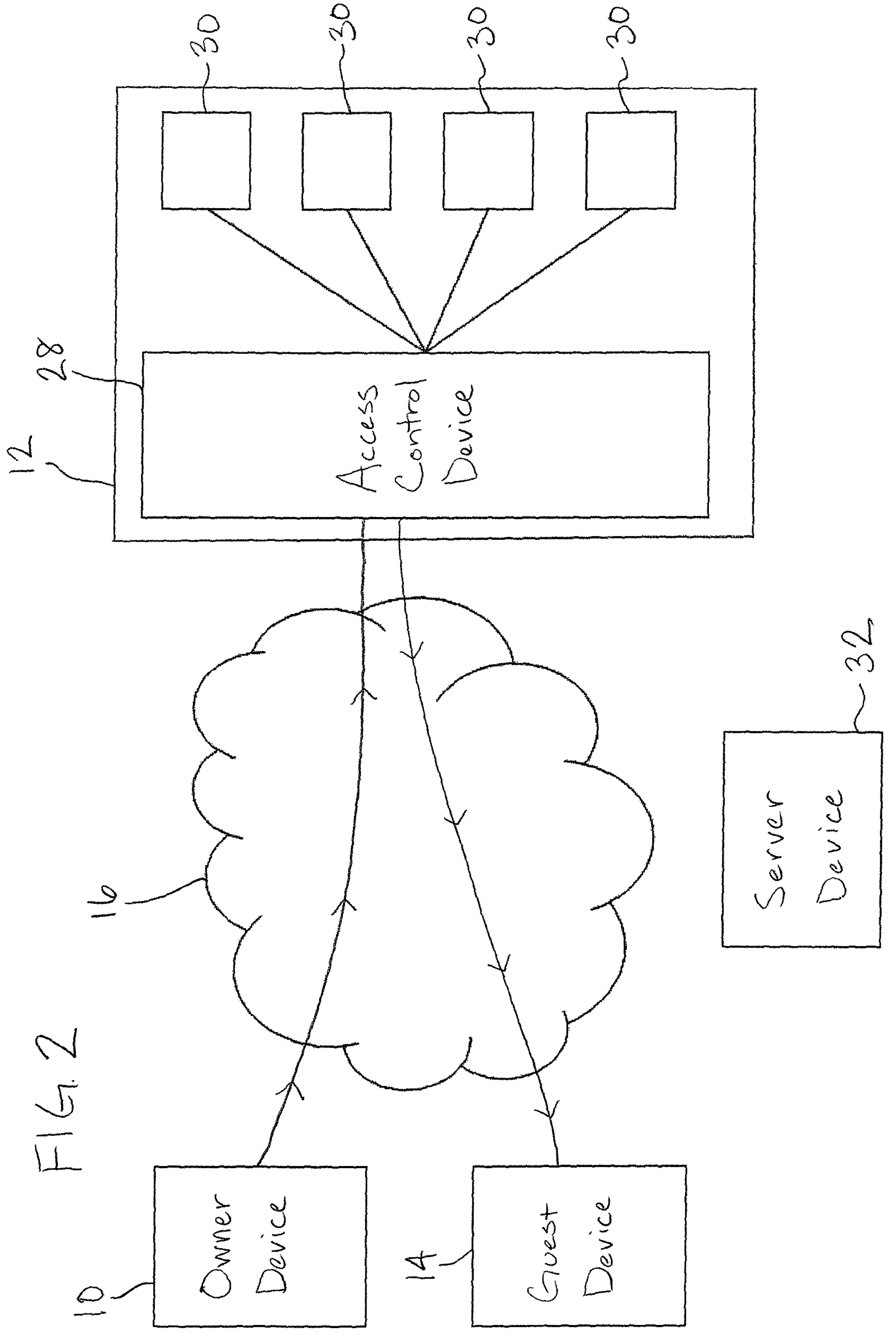
FIG. 2 is a schematic diagram showing communication to send access rights to a guest device from an owner device to an access control device to the guest device.

In another example, shown in FIG. 2, the owner device 10 transmits a request to the access control device 28 that the access control device 28 send the access rights data to the guest device 14. Upon reception of the request, the access control device 28 assumes the responsibility to send the access rights data to the guest device 14. The application on the owner device 10 can send the access rights data along with the request or the access control device 28 can send access rights data stored in its own system. The owner device 10 also transmits identification information of the guest device 14, so that the access control device 28 can identify the guest device 14 and transmit the access rights data or the application along with the access rights data to the guest device 14, similarly to that described above.

Figure 3:
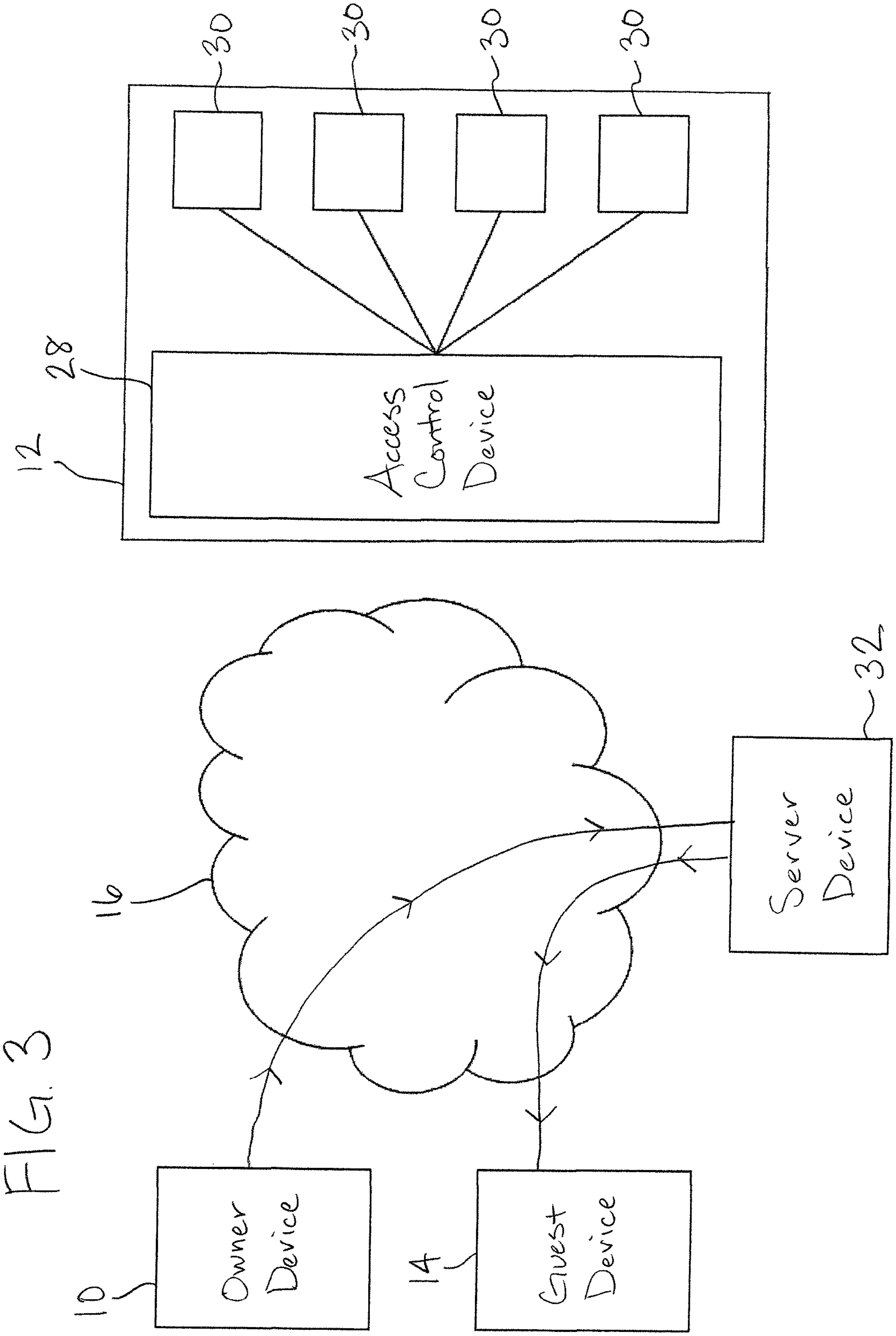
FIG. 3 is a schematic diagram showing communication to send access rights to a guest device from an owner device to a third party server device to the guest device.

Turning now to FIG. 3, in this example the intermediary device 32 can facilitate communication between the owner device 10 and the guest device 14. The intermediary device 32 can be a server device, either owned by one of the parties to the transaction or owned by a separate third party, such as an owner and distributor of the application, the access control device, or both. By one approach, the access control device 28 can have the application installed thereon so that the device 28 can easily operate within the parameters of the application running on the owner and guest devices 10, 14. The owner device 10 transmits the request to the intermediary server, which then assumes responsibility for transmitting the access rights data to the guest device 14. As with the example of FIG. 2, the access rights data can be sent by the owner device 10 or the intermediary server 32 can have the access rights data stored thereon or have access to the access rights data in a separate database. Upon reception of the request, the intermediary server 32 transmits the access rights data, which can include the application, a link to a website to download the application, or identification information of the application, to the guest device 14.

Figure 4:
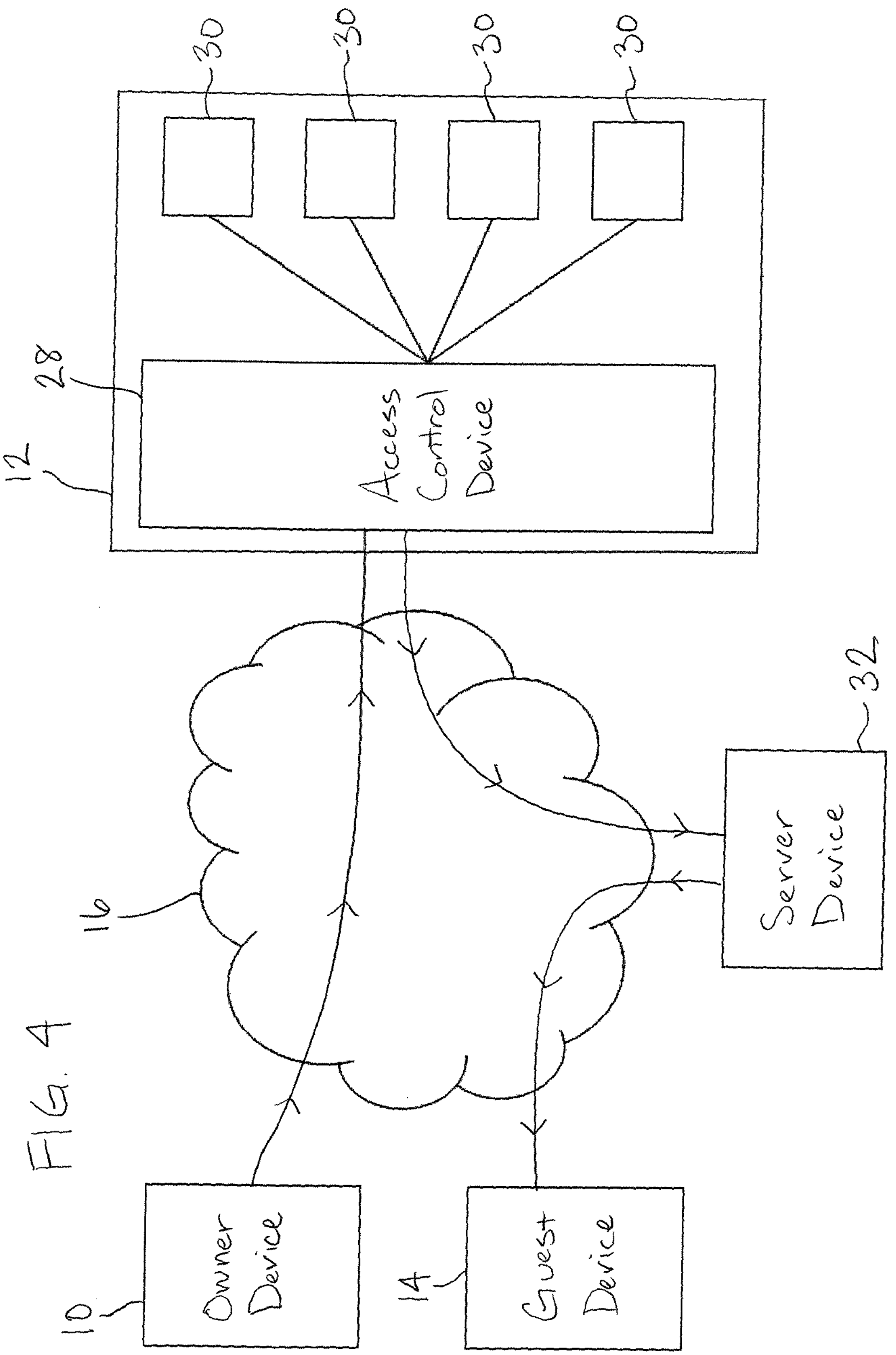
FIG. 4 is a schematic diagram showing communication to send access rights to a guest device from an owner device to an access control device to a third party server device to the guest device.
Figure 5:
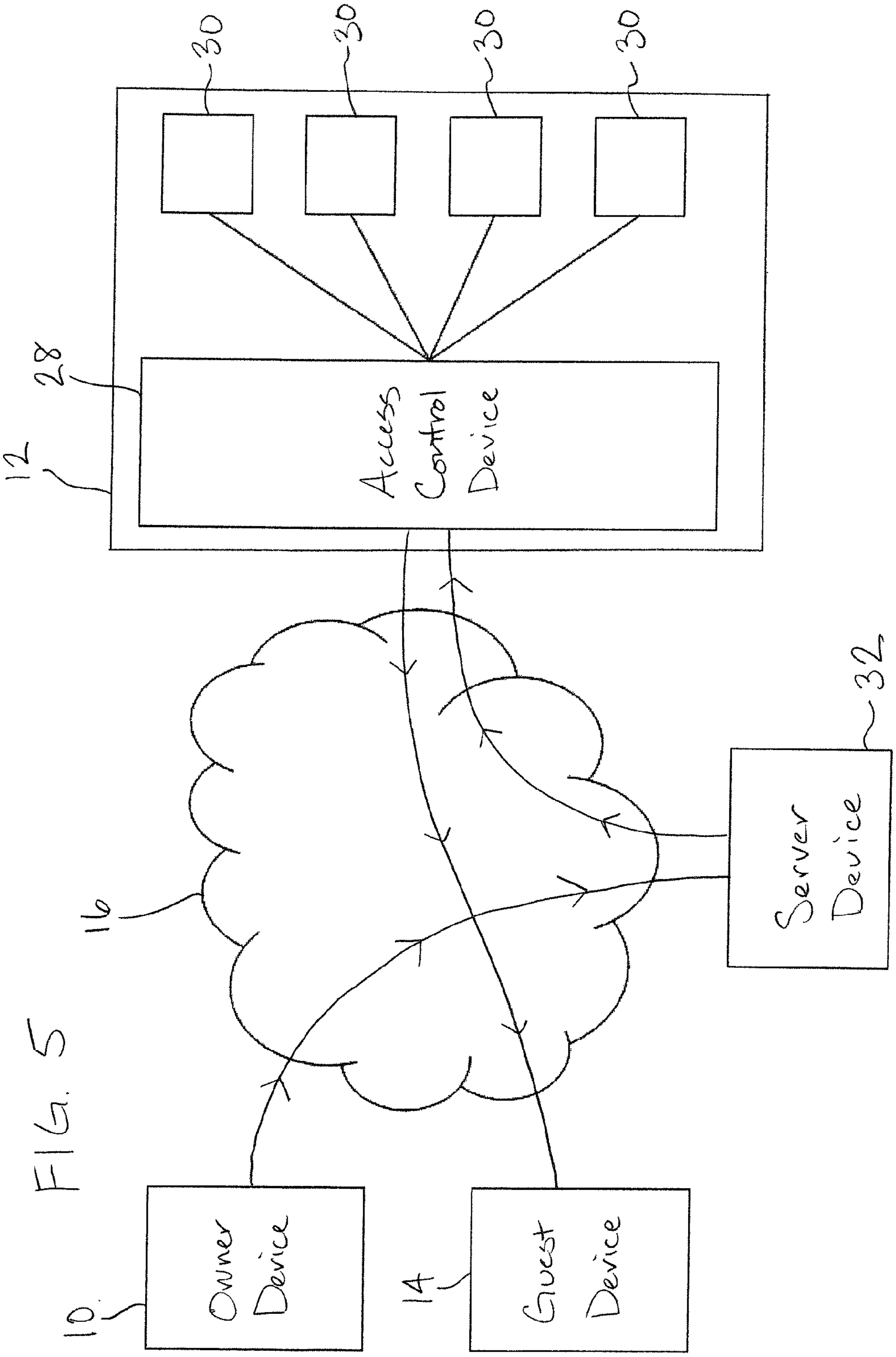
FIG. 5 is a schematic diagram showing communication to send access rights to a guest device from an owner device to a third party server device to an access control device to the guest device.

Other example communication configurations, as shown in FIGS. 4 and 5, include both the access control device 28 and the intermediary server 32. In a first approach of FIG. 4, the owner device 10 sends the request to the access control device 28, similar to that described above, then the access control device 28 forwards the request to the intermediary server 32. The intermediary server 32 assumes responsibility for sending the access rights data to the guest device 14. In a second approach of FIG. 5, the owner device 10 sends the request to the intermediary server 32, similar to that described above, then the intermediary server 32 forwards the request to the access control device 28. The access control device 28 assumes responsibility for sending the access rights data to the guest device 14. In either of these approaches, as discussed previously, the access rights data can be sent from any of the owner device 10, the access control device 28, or the intermediary server 32.

Figure 6:
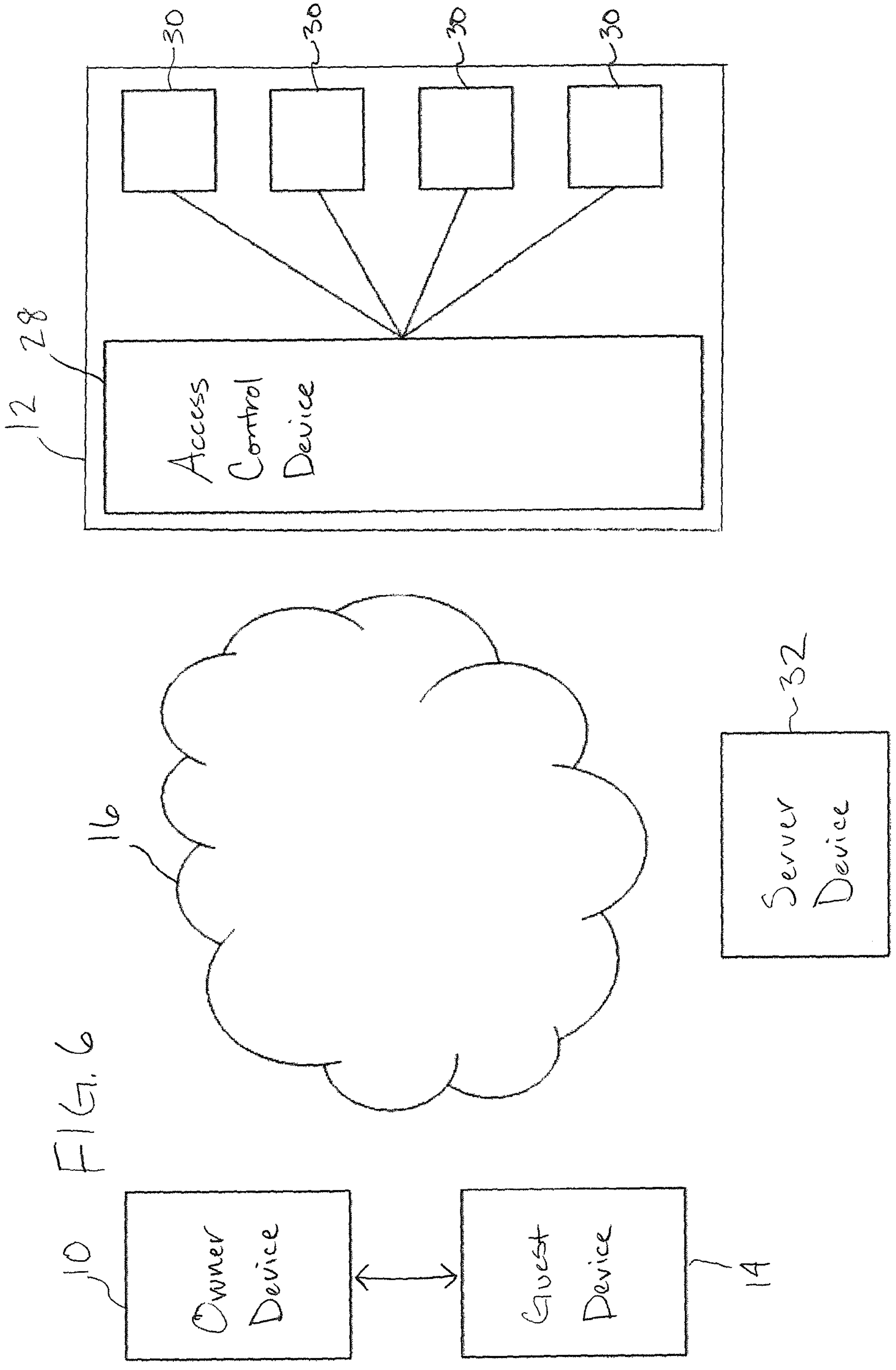
FIG. 6 is a schematic diagram showing communication to send access rights to a guest device from an owner device using near field communication.

By other approaches, as shown in FIG. 6, exchange of information, including the application and/or the access rights data, can utilize near field communication (NFC) between the owner and guest devices 10 and 14. In these approaches, the owner and guest bring their respective owner and guest devices 10 and 14 within short range, i.e., within about few inches, of one another to transmit information back and forth. The owner device 10 can initiate the NFC with the guest device 14 in order to transfer the application directly to the guest device, and the guest device 14 can then download and install the application, as discussed previously. Moreover, the application itself can utilize NFC to transfer the access rights data to the guest device 14. In this approach, the owner device 10 can operate the application which utilizes NFC to initiate communication with the guest device and transfer the access rights data thereto. The application running on the guest device 14 can further make it receptive to the NFC transmission from the owner device. Alternatively, the owner device can transfer both the application and access rights within a single transmission. By other approaches, the guest device can initiate the NFC to request the various transmissions discussed above.

In all of the above communication examples, the application can include a self-test operation. Specifically, the self-test operation can cause the guest device 14, upon reception of the access rights data, to send a test control signal to the access control device 28. The self-test operation can either do this automatically upon reception and storage, can require the application to transmit the test control signal within a specified time, or can require the application to transmit the test control signal prior to a first use. The test signal can result in the access control device 28 and/or the secondary device 30 transmitting a confirmation signal in response to the test signal, which can be routed through the intermediary server 32. The confirmation signal can be transmitted to the guest device 14 and/or the owner device 10, as desired. Alternatively, operation of one of the secondary devices 30 by the guest device 14 can confirm to both the owner and operator that the transmission of the access rights data was successful. In another example, the test control signal can be configured by the application to cause a specified action with one of the secondary devices, such as chosen by the owner, so that the owner can identify when the transmission of the access rights data is successful. For example, the owner can tell the application to energize a specific light, send a test signal to an alarm, or other audio and/or visual actions.

Turning now to examples of operation of the interaction between the guest device 14 and the access control device 28 after the guest device 14 successfully receives the access rights data from the owner device 10, as shown in FIGS. 7-11.

Figure 7:
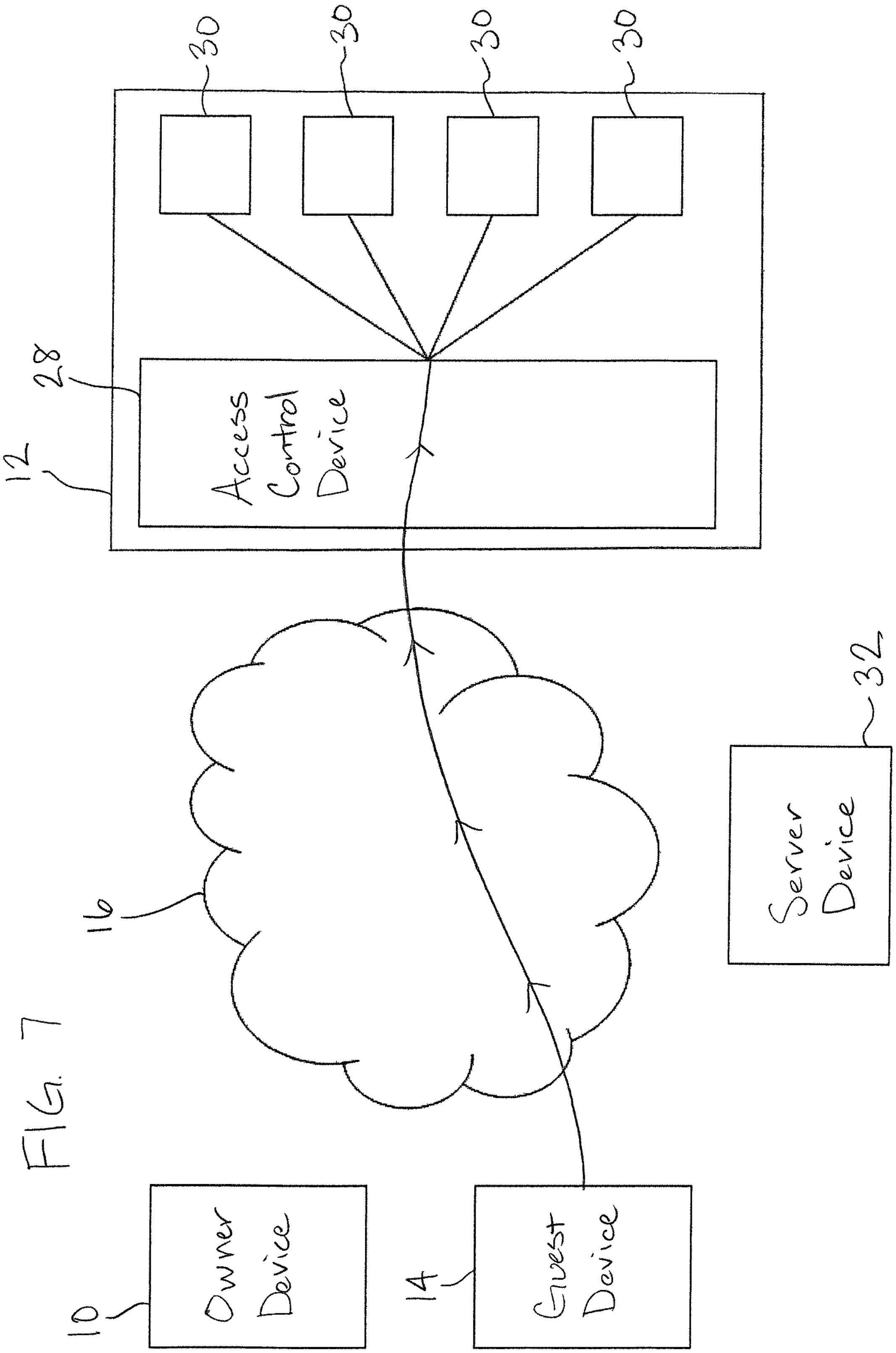
FIG. 7 is a schematic diagram showing communication to grant a guest device access to an access control device from the guest device to the access control device.

In the most straightforward example, as shown in FIG. 7, the guest runs and operates the application on the guest device 14 to send an authorized control signal directly to the access control device 28 identified in the access rights data through a communication network 16. The authorized control signal identifies a desired action to be performed at the secondary device 30. The access control device 28, upon reception and verification of the credentials of the control signal from the guest device 14, then causes the desired action at the secondary devices 30, either by performing the action in the integral example or by translation of the control signal to a device specific language and sending the control signal to the separate secondary device 30.

Figure 8:
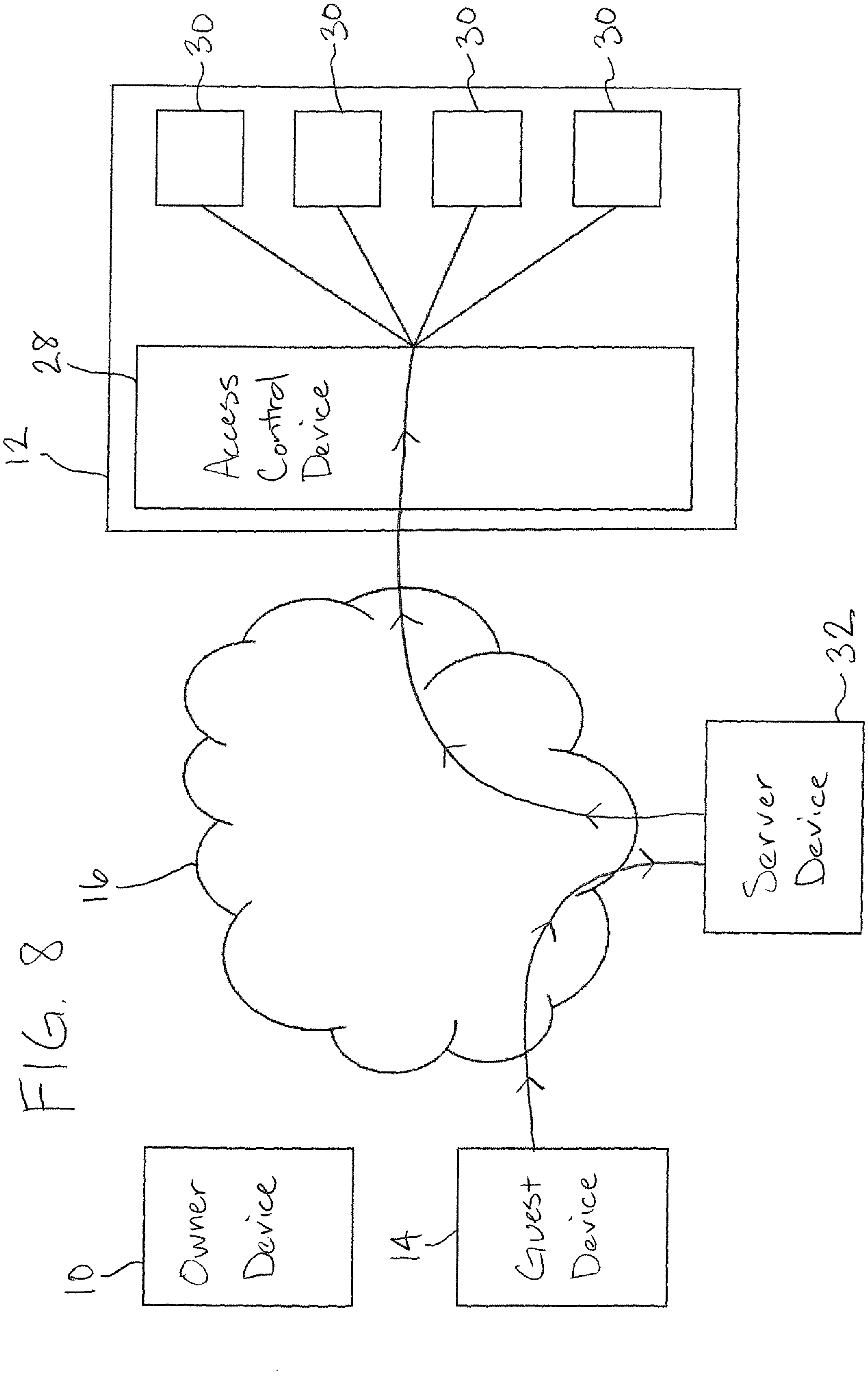
FIG. 8 is a schematic diagram showing communication to grant a guest device access to an access control device from the guest device to a third party server device to the access control device.

In another example, as shown in FIG. 8, the intermediary server 32 can act as a relay for the authorized control signal from the guest device 14. In this example, the application operating on the guest device 14 causes the control signal to be transmitted to the intermediary server 32 through the communication network 16, which then forwards the control signal to the access control device 28 identified by the application. If desired, the intermediary server 32 can log each control signal sent from the guest device 14. This is particularly advantageous in a situation where guest access control is purchased by the guest. The server logging each time a control signal is received from guest device 14 can allow the owner to charge for each control usage. By another approach, the owner can configure or request the intermediary server 32 to deny access control rights to an identified guest device 14 at times chosen by the owner. This is advantageous in an example where a guest prepays for access control and the guest does not have a sufficient balance, or the guest has a balance due.

Figure 9:
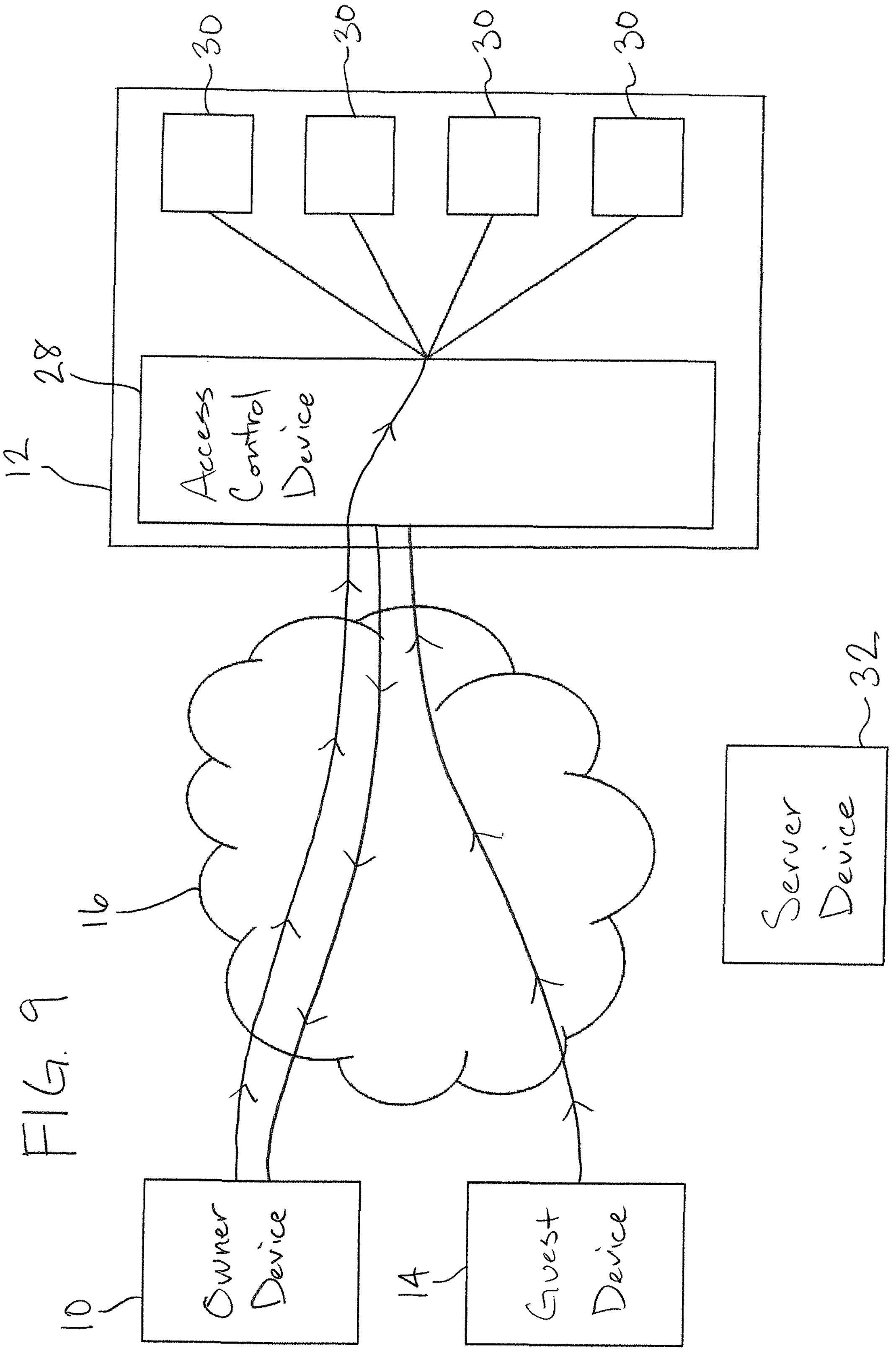
FIG. 9 is a schematic diagram showing communication to grant a guest device access to an access control device from the guest device to the access control device, and the access control device confirming authorization of the guest device with an owner device.
Figure 10:
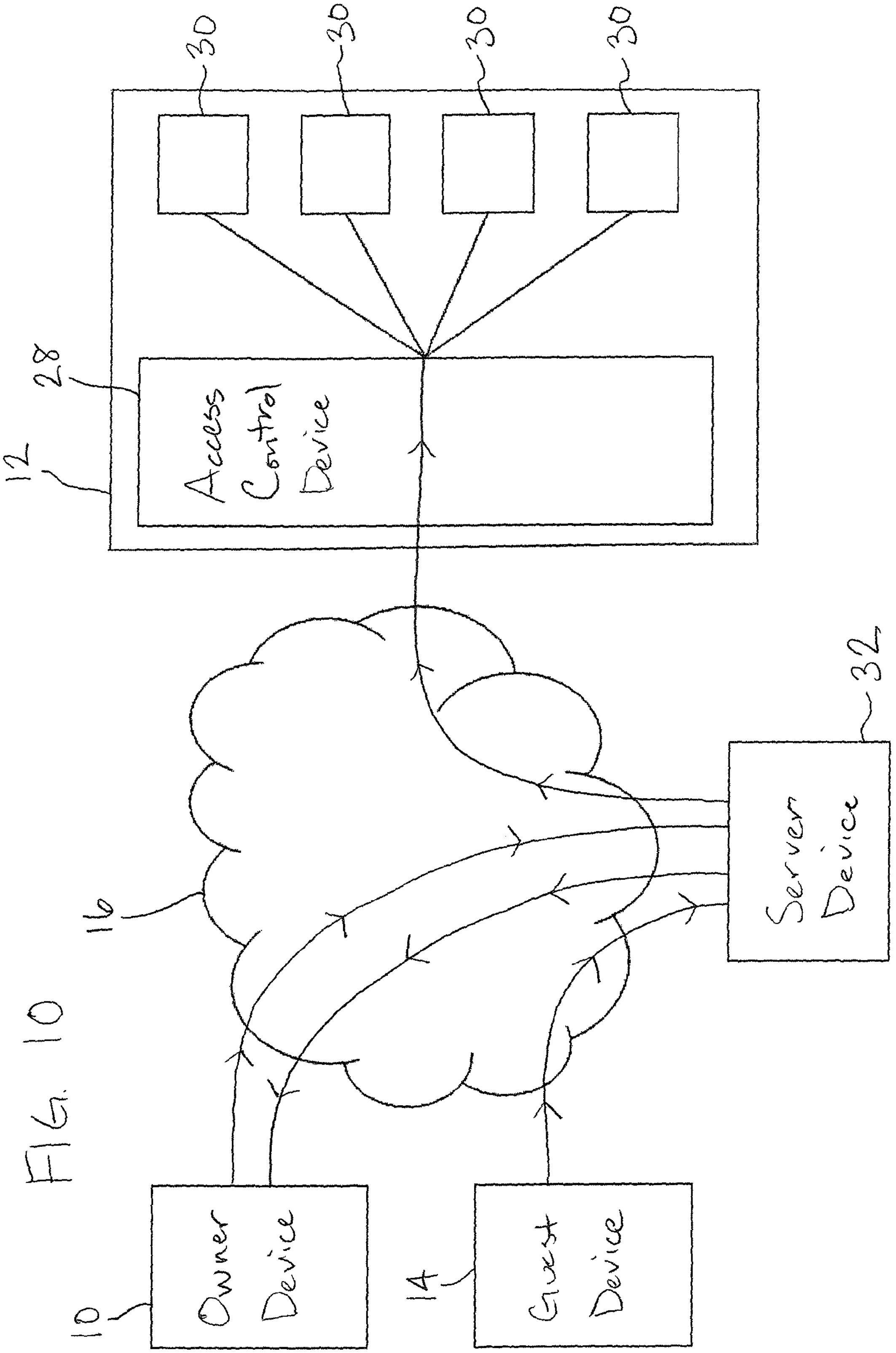
FIG. 10 is a schematic diagram showing communication to grant a guest device access to an access control device from the guest device to a third party device, the third party server device confirming authorization of the guest device with an owner device, and the third party communicating with the access control device.
Figure 11:
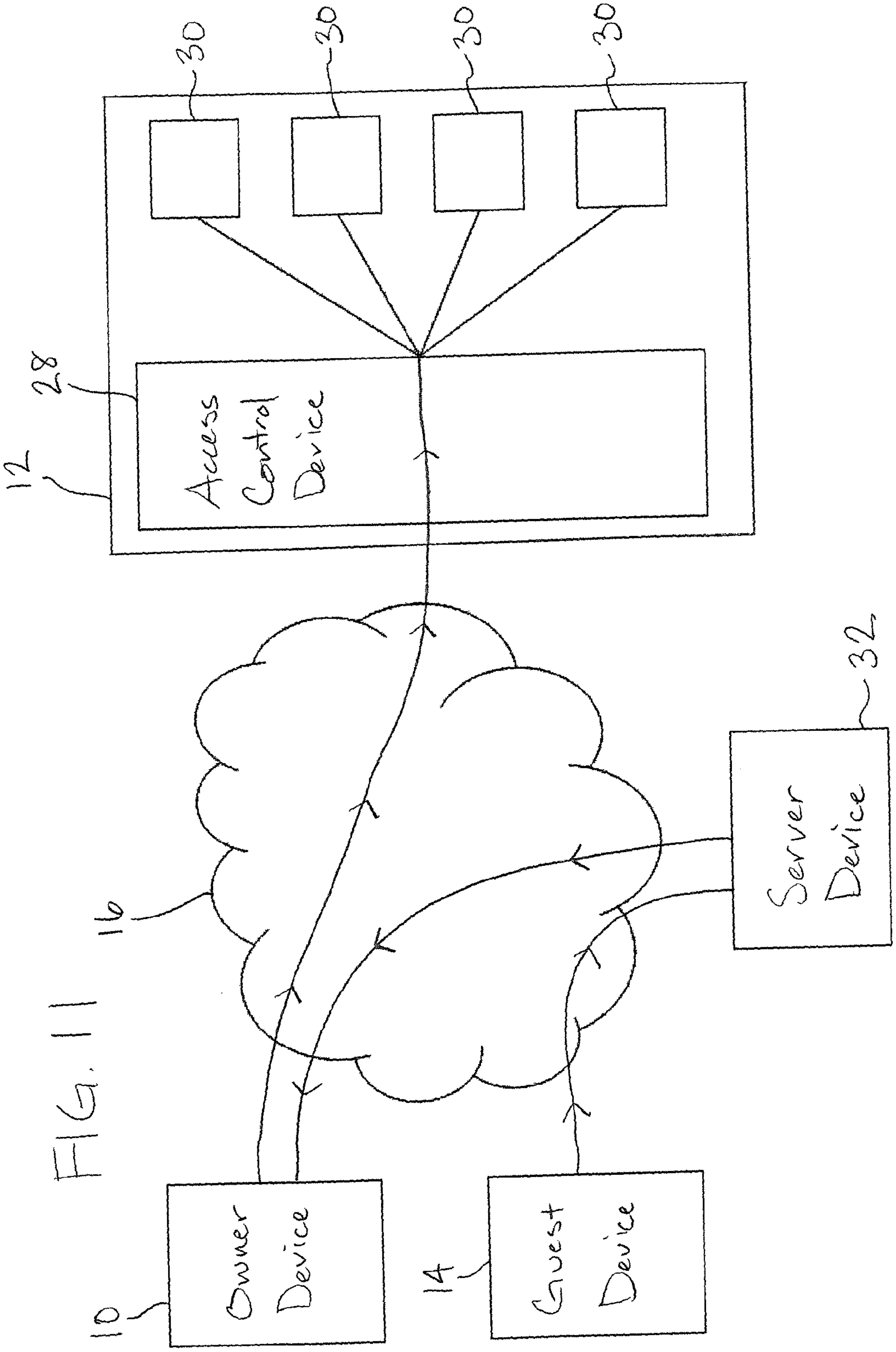
FIG. 11 is a schematic diagram showing communication to grant a guest device access to an access control device from the guest device to a third party server device, the third party service device confirming authorization of the guest device with an owner device, and the owner device communicating with the access control device.

In the examples shown in FIGS. 9-11, the owner device 10 is requested to confirm each attempt of the guest device 14 to send a control signal to the access control device 28. In a first example of FIG. 9, the guest device 14 transmits an authorized control signal to the access control device 28, similar to the operation discussed with respect to FIG. 7. Instead of directly passing the control signal to the identified secondary device 30, however, the access control device 28 instead transmits a confirmation request signal or message to the owner device 14. The confirmation request signal allows an owner to admit or deny the request of the guest device 14. For example, the application can display an interface with "admit" and "deny" access control options for the owner to select. If the owner denies access, the application identifies the decision and transmits a denial signal or message to the access control device 28, which then denies access to the guest device and does not cause the requested action to be performed. The access control device 28 can also send a denial confirmation signal or message to the guest device 14 to inform the guest of the owner's decision. If the owner allows access, the application identifies the decision and transmits an allow signal or message to the access control device 28, which then performs the requested action at the secondary device 30 or translates the control signal and passes the signal onto the identified secondary device 30 to perform the requested action.

In a second example of FIG. 10, the guest device transmits an authorized control signal to the intermediary server 32, similar to the operation discussed with respect to FIG. 8. Instead of passing the control signal to the access control device 28, however, the intermediary server 32 instead routes the guest's requested control signal or message to the owner device 14. This allows the owner to admit or deny the guest access. If the owner denies access, the application identifies the decision and transmits a denial signal or message to the intermediary server 32, which then refuses to forward the control signal onto the access control device 28. The intermediary server 32 can also send a denial confirmation signal or message to the guest device 14 to inform the guest of the owner's decision. If the owner allows access, the application identifies the decision and transmits an allow signal or message to the intermediary service 32, which then forwards the guest's control signal to the access control device 28. As discussed above, the access control device 28 then performs the requested action at the secondary device 30 or translates the control signal and passes the signal onto the identified secondary device 30 to perform the requested action.

In another example of FIG. 11, the guest device transmits an authorized control signal to the intermediary server 32. Instead of passing the control signal to the access control device 28, however, the intermediary server 32 instead routes the guest's requested control signal or message to the owner device 14, similar to the operation discussed with respect to FIG. 10. In this example, however, the owner is given the task of forwarding the control signal to the access control device 28. This provides an alternative method for the owner to admit or deny the guest access. If the owner denies access, the application can simply not forward the control signal to the access control device 28. If desired, the application can also transmits a denial signal or message back to the intermediary server 32, which can then send the denial message to the guest device 14 to inform the guest of the owner's decision, or to the guest device 14 directly. If the owner allows access, the application identifies the decision and forwards the guest's control signal to the access control device 28. As discussed above, the access control device 28 then performs the requested action at the secondary device 30 or translates the control signal and passes the signal onto the identified secondary device 30 to perform the requested action.

The matter set forth in the foregoing description and accompanying drawings is offered by way of illustration only and not as a limitation. While particular embodiments have been shown and described, it will be apparent to those skilled in the art that changes and modifications may be made without departing from the broader aspects of applicants' contribution. The actual scope of the protection sought is intended to be defined in the following claims when viewed in their proper perspective based on the prior art.

What is claimed is:

1. An apparatus comprising:

a receiver configured to receive one or more transmissions over a communication network at the behest of an owner device, the transmissions including at least application identification information for an application and access rights data to an owner access control device;

a guest device configured to download, install, and run the application;

a user input device, the application configured to receive instruction from the user input device; and a transmitter configured to transmit a control signal based on the access rights data after a determination by the guest device that there are no applicable restrictions in the access rights data to the owner access control device in response to instruction from the application to cause an action at a premises associated with the owner access control device.

2. The apparatus of claim 1 wherein the access rights data comprises access control device identification information and credentials for authorized communication with the access control device.

3. The apparatus of claim 2 wherein the restrictions comprise temporal restrictions on the use of the credentials.

4. The apparatus of claim 1 wherein the application identification information and access rights data are transmitted in a single transmission.

5. The apparatus of claim 1 wherein the application identification information comprises a link to download the application.

6. The apparatus of claim 1 wherein the application identification information comprises the application.

7. The apparatus of claim 1 wherein the receiver and transmitter are configured to operate over the internet.

8. The apparatus of claim 1 further comprising a storage device having the application stored thereon.

9. The apparatus of claim 1 wherein the application is non-native.

10. The apparatus of claim 1 wherein the owner access control device is a movable barrier operator and the transmitter is configured to transmit via the application a control signal to move a movable barrier with the movable barrier operator.

11. The apparatus of claim 1 wherein the owner access control device is a door access control and the transmitter is configured to transmit via the application a control signal to unlock a door with the door access control.

12. A method comprising:

receiving one or more transmissions over a communication network at the behest of an owner device at a guest device, the transmissions including at least application identification information and access rights data to an owner access control device;

operating the application on the guest device;

receiving an instruction signal from a user input device;

determining, by the guest device, whether there are any applicable restrictions in the access rights data; and transmitting a control signal with a transmitter of the guest device based on the access rights data, in response to determining that there are no applicable restrictions in the access rights data, to the owner control device via the application, the control signal configured to cause an action at a premises associated with the owner access control device.

13. The method of claim 12 wherein receiving and transmitting is performed over the internet.

14. The method of claim 12 wherein the application identification information and the access rights data are received via separate transmissions.

15. The method of claim 12 wherein transmitting the control signal to the owner access control device comprises transmitting the control signal to an intermediary server device, with the intermediary server device transmitting the control signal to the owner access control device.

16. The method of claim 12 wherein transmitting the control signal to the owner access control device comprises sending a confirmation signal to the owner device.

17. The method of claim 12 wherein receiving the access rights data comprises receiving owner access control device identification information and credentials for authorized communication with the owner access control device.

18. The method of claim 17 wherein the restrictions comprise temporal restrictions, and wherein receiving the credentials comprises receiving the temporal restrictions on the use of the credentials.

19. The method of claim 12 further comprising downloading and installing the application on the guest device.

20. The method of claim 12 further comprising transmitting a self-test signal to the access control device.

21. The method of claim 12 wherein owner access control device is a movable barrier operator and transmitting the control signal comprises transmitting a control signal to move a movable barrier with the movable barrier operator.

22. The method of claim 12 wherein the owner access control device is a door access control device and the transmitting the control signal comprises transmitting a control signal to unlock a door with the door access control device.

23. An apparatus comprising:

a processor device configured to run an application;

an interface configured to receive input to instruct the application to send a package to a guest device, the package comprising the application and access rights data for accessing an owner access control device;

a transmitter configured to send the package to the guest device via the application, the application and the access rights data configured to allow the guest device to send a control signal, after determination by the guest device that there are no applicable restrictions in the access rights data, to the owner access control device to cause an action at a premises associated therewith.

24. The apparatus of claim 23 further comprising a storage device configured to store the application therein.

25. The apparatus of claim 23 further comprising a receiver configured to receive a confirmation signal upon the guest device successfully receiving the package via the application.

26. The apparatus of claim 23 wherein the transmitter is configured to send the package over the internet via the application.

27. The apparatus of claim 23 wherein the transmitter is configured to send the package via the application to the guest device through an intermediary server.

28. The apparatus of claim 23 further comprising a receiver configured to receive the control signal from the guest device via the application, and wherein the transmitter is further configured to transmit the control signal to the owner access control device.

29. The apparatus of claim 28 wherein the application is configured to present an option on the interface to deny transmitting the control signal to the owner access control device.

30. The apparatus of claim 23 wherein owner access control device is a movable barrier operator and the transmitter is configured to transmit a control signal to move a movable barrier with the movable barrier operator.

31. The apparatus of claim 23 wherein the owner access control device is a door access control and the transmitter is configured to transmit a control signal to unlock a door with the door access control.

32. A method comprising:

running an application on an owner device;

receiving access rights data for accessing an owner access control device at the owner device;

transmitting a package to a guest device, the package comprising the application and the access rights data, the package configured to allow the guest device to send a control signal, after determination by the guest device that there are no applicable restrictions in the access rights data, to the owner access control device via the application to cause an action at a premises associated therewith.

33. The method of claim 32 transmitting the package is performed over the internet.

34. The method of claim 32 wherein the application and the access rights data are transmitted via separate transmissions.

35. The method of claim 32 wherein transmitting the package to the guest device comprises transmitting the package to an intermediary server device, with the intermediary server device transmitting the package to the guest device.

36. The method of claim 32 further comprising receiving a confirmation signal from the guest device upon successful reception of the package.

37. The method of claim 32 wherein receiving the access rights data comprises receiving owner access control device identification information and credentials for authorized communication with the owner access control device.

38. The method of claim 37 further comprising receiving restrictions on the use of the credentials.

39. The method of claim 32 wherein owner access control device is a movable barrier operator and wherein the package is configured to allow the guest device to send a control signal to the movable barrier operator to move a movable barrier with the movable barrier operator.

40. The method of claim 32 wherein the owner access control device is a door access control and the wherein the package is configured to allow the guest device to send a control signal to the door access control to unlock a door with the door access control.

* * * * *